US008209672B2

(12) United States Patent
Ivanov

(10) Patent No.: US 8,209,672 B2
(45) Date of Patent: Jun. 26, 2012

(54) SYSTEMS AND METHODS FOR TRANSFORMING MODELED BUSINESS PROCESSES INTO EXECUTABLE PROCESSES

(75) Inventor: Konstantin Ivanov, Saarbruecken (DE)

(73) Assignee: Software AG, Darmstadt (DE)

( * ) Notice: Subject to any disclaimer, the term of this patent is extended or adjusted under 35 U.S.C. 154(b) by 1420 days.

(21) Appl. No.: 11/798,587

(22) Filed: May 15, 2007

(65) Prior Publication Data

US 2007/0266377 A1 Nov. 15, 2007

Related U.S. Application Data

(60) Provisional application No. 60/800,014, filed on May 15, 2006.

(51) Int. Cl.
G06F 9/45 (2006.01)
(52) U.S. Cl. ........ 717/136; 717/104; 717/106; 717/120; 717/137
(58) Field of Classification Search .................... 717/136
See application file for complete search history.

(56) References Cited

U.S. PATENT DOCUMENTS

| 7,657,411 B2* | 2/2010 | Poetsch et al. ............. 703/6 |
| 2005/0171833 A1* | 8/2005 | Jost et al. ............... 705/10 |
| 2006/0293941 A1 | 12/2006 | Ivanov et al. |
| 2007/0005618 A1 | 1/2007 | Ivanov et al. |
| 2007/0179821 A1* | 8/2007 | Poetsch et al. ............. 705/7 |
| 2007/0245297 A1* | 10/2007 | Kuester et al. ............ 717/104 |

OTHER PUBLICATIONS

J. Ziemann and J. Mendling, "EPC-Based Modelling of BPEL Processes: A Pragmatic Transformation Approach," Proceedings of the 7th International Conference on Modern Information Technology in the Innovation Processes of the Industrial Enterprises (MITIP 2005), Genova, Italy (2005).*
Jan Mendling, Michael Moser, and Gustaf Neumann. 2006. Transformation of yEPC business process models to YAWL. In Proceedings of the 2006 ACM symposium on Applied computing (SAC '06). ACM, New York, NY, USA, 1262-1266. DOI=10.1145/1141277. 1141572 http://doi.acm.org/10.1145/1141277.1141572.*
Denitza Fuchs et al., U.S. Appl. No. 12/318,011 for "Systems and Methods for Graphically Developing Rules for Transforming Models Between Descriptiion Notations."
Andrews et al., "Business Process Execution Language for Web Services," May 5, 2003, Version 1.1(136 pages).
Christensen et al., "Web Services Description Language (WSDL) 1.1," Mar. 15, 2001, available at http://www.w3.org/TR/wsdl (31 pages).
Bray et al., "Namespaces in XML," 1999, Jan. 14, 2999, available at http://www.w3.org/TR/1999/REC-xml-names-19990114/ (11 pages).

(Continued)

Primary Examiner — Wei Zhen
Assistant Examiner — Matthew Brophy
(74) Attorney, Agent, or Firm — Finnegan, Henderson, Farabow, Garrett & Dunner, LLP

(57) ABSTRACT

Systems and methods are provided for transforming modeled business processes into executable processes. The modeled processes may comprise graphically modeled business processes. The executable processes may comprise processes suitable for execution by a computerized or software-based system. In one embodiment, transformation rules are provided for mapping or converting, for example, EPC model constructs to BPEL constructs. The transformation rules can be applied to graphical constructs in a modeled business process to generate an executable business process comprising an ordered sequence of programming constructs. The ordered sequence of programming constructs can be stored in a database for subsequent execution of the executable business process.

30 Claims, 21 Drawing Sheets

OTHER PUBLICATIONS

Thompson et al., "XML Schema Part 1: Structures Second Edition," Oct. 28, 2004, available at http://www.w3.org/TR/xmlschema-1/ (91 pages).

Van Der Aalst et al., "Workflow Patterns," *Distributed and Parallel Databases*, Jul. 2003, vol. 14, No. 1, Springer Netherlands, The Netherlands (70 pages).

Wohed et al., "Pattern Based Analysis of BPEL4WS," Apr. 2002, QUT Technical Report FIT-TR-2002-04, Queensland University of Technology, Brisbane, Australia (20 pages).

Mendling et al., "Towards Workflow Pattern Support of Event-Driven Process Chains (EPC)," *Proceedings of the 2nd GI-Workshop XML4BPM*, 2005, Karlsruhe, Germany (15 pages).

Nantes et al., "ATL: Atlas Transformation Language," ATL Starter's Guide, Version 0.1, Dec. 2005, pp. 1-20.

Nantes et al., "ATL: Atlas Transformation Language," ATL User Manual, Version 0.7, Feb. 2006, pp. 1-88.

QVT, Retrieved on May 29, 2009, from http://en.wikipedia.org/wiki/QVT (3 pages).

Meta Object Facility (MOF) 2.0 Query/View/Transformation Specification, Retrieved on May 11, 2001, from http://www.omg.org/docs/ptc/05-11-01.pdf, pp. 1-190.

Murzek et al., "Structural patterns for the Transformation of Business Process Models," Accepted at the International Workshop on Models for Enterprise Computing (IWMEC 2006) at the 10th IEEE International EDOC Conference (EDOC 2006) "The Enterprise Computing Conference," Hong Kong, Oct. 2006 (10 pages).

Murzek et al., "Business Process Model Transformation Issues—The top 7 adversaries encountered at defining model transformations," Conference Paper at the 9th International Conference on Enterprise Information Systems ICEIS 2007, Funchal, Madeira—Portugal, Jun. 2007 (8 pages).

Murzek et al., "Model Transformation in Practice Using the BOC Model Transformer," Paper for the Workshop "Model Transformation in Practice" at MoDELS 2005, Montego Bay, Jamaica, Oct. 2005 (31 pages).

Murzek et al., "Defining Model Transformations for Business Process Models Graphically," Position Paper for Workshop "Enterprise Modeling and Ontology: Ingredients for interoperability" at PAKM 2004, Vienna, VA, Dec. 2004 (8 pages).

Stein et al., "EPK nach BPEL Transformation als Voraussetzung für praktische Umsetzung einer SOA," 2007 (6 pages) and English abstract (1 page).

\* cited by examiner

SYSTEMS AND METHODS FOR TRANSFORMING MODELED BUSINESS PROCESSES INTO EXECUTABLE PROCESSES

CROSS REFERENCE TO RELATED APPLICATION(S)

This application claims the benefit of priority from U.S. Provisional Application No. 60/800,014, entitled "SYSTEMS AND METHODS FOR TRANSFORMING MODELED BUSINESS PROCESSES INTO EXECUTABLE PROCESSES," filed May 15, 2006, the disclosure of which is expressly incorporated herein by reference to its entirety.

BACKGROUND

I. Technical Field

The present invention generally relates to the field of data processing and to software-based tools for modeling and executing processes. More particularly, and without limitation, the invention relates to systems and methods for transforming modeled processes into executable processes. The modeled processes may comprise graphically modeled business processes. The executable processes may comprise processes suitable for execution by a computerized or software-based system.

II. Background Information

Business processes are the driving factors of a successful company. On the operational level, business processes are a description of consecutive functions or activities in order to create added value. Business processes may relate to various activities of a company, such as the handling of purchase orders or product returns. Business processes can also be used to describe the interaction between various types of business information, such as the organization of a business, data used by a business, functions that describe the operation of a business, and products or services offered by a business.

Successful companies often design their processes with the help of modeling tools. Modeling tools can depict, analyze and optimize the development of a business process, and can be used with other types of business information as well. A "modeling tool" may include software and/or other computerized components or modules that can be used to plan a business process or other business information, and can be used to model all or part of a business process or other aspects of a business. By way of example, a modelling tool can be used to generate descriptions of business information in a "description notation." A description notation can be a format for written or executable computer code, such as WSDL (Web Services Description notation) or BPEL (Business Execution Language for Web Services), or a description notation can be a formalized way of graphically illustrating concepts, such as EPC (event-driven process chain) or VAC (value-added chain diagram).

Modeling tools are commercially available from various vendors. For example, the ARIS Platform of IDS Scheer AG (Saarbruecken, Germany) has been a market leader for Business Process Modeling tools. ARIS provides several description notations proven in practice to enable businesses to optimize their strategy and processes. By providing description notations well suited for modeling different facets of a business, ARIS enables business information to be modeled at varying levels of detail, and from different perspectives or "views."

The description notations used by ARIS are structured into five (5) views to present an organized description of business information. These views include: (i) Organization: description of the organizational structure; (ii) Data: description of the business data structure; (iii) Functions: description of the business tasks regarding the hierarchical structure; number and structure of applications supporting the execution of the business tasks; (iv) Product/Services: description of products and services produced by the company; and (v) Processes (or control): description of the interaction of elements originated from the four (4) views mentioned above. In addition, each view can be partitioned into different levels, known as a view hierarchy. For example, the view hierarchy for the process/control view is known as the process hierarchy: requirements definition; design specification; and implementation description. View hierarchies can be defined for each view, and can be supplemented or modified if the user so desires.

Each of the five views ARIS defines for business information can be modeled using description notations provided by ARIS, and different description notations can be used for different levels within a view. Thus, a "business information model" can be created for the process view, and called a "business process model." Similarly, for a data view, a "business data model" could be created, and for an organization view, a "business organization model" could be created. Each business information model can provide information relevant to one or more levels of the view hierarchy for the view with which it is relates, i.e. business data models provide information about levels of the data hierarchy. Models at different levels can be used to provide various degrees of refinement at different layers of a view hierarchy. As an example, the process view, also known as the control view, can be modeled differently at the requirements definition, design specification, and implementation description levels, with each of the levels providing different degrees of refinement about processes that occur within the business.

The requirements definition level describes the business problem in a user-friendly way, but also serves as a formal description that can be starting point for a consistent transformation into an information technology (IT) implementation. Typically, ARIS users will generate VAC diagrams for the most basic explanation at the requirements level, and use EPC diagrams to describe in more detail the requirements for steps in the VAC diagrams.

An EPC diagram is an ordered graphical representation of events and functions. Further, an EPC diagram provides connectors that allow alternative and parallel execution of processes. For example, EPC diagrams may include logical operators, such as OR, AND, and XOR, that describe relationships between elements of the process. An "element" may refer to one step or activity, for example. Additionally, in an EPC model, logical relationships between elements are termed a "control flow." However, an EPC model, while graphical, does not actually implement a business process. It is merely a schematic representation of a business process.

Using EPCs, the procedural organization of a company can be defined. Links between concepts within the data, function and organizational view can be used to represent various business processes. The EPC can thus be used to describe the details of functions or activities within a business process. EPCs can be thought of as logical models, appropriate generally for modeling business processes or other views of a business.

The design specification level is used to transfer the terms from the requirements definition level into categories suitable for realization by information technology. If the EPC from the requirements definition level has functionality which is amenable to being implemented by web services, it can be advantageous to create a model that is tied to executable code written in, for example, Business Process Execution Language (BPEL). BPEL is an XML-based standardized language that is commonly used by companies for service orchestration. Examples of other languages include XML Process Definition Language (XPDL) and Electronic Business XML (ebXML). From a general perspective, BPEL is like a programming language containing elements for creating loops, sequences, conditions, etc. BPEL provides a standardized interface for web services and can be used across both computer platforms and organizational entities.

The BPEL standard, however, does not define a graphical means of representing BPEL code. As a result, BPEL itself is not ideal for design specification modeling by non-technical personnel. As described in U.S. Patent Publication Nos. US-2006-0293941-A1 and US-2007-0005618-A1, the disclosures of which are expressly incorporated herein by reference to their entireties, ARIS provides a graphical description notation for the representation of BPEL processes in a BPEL Process Model (BPM) and BPEL Allocation diagrams (BPADs). Using this notation, BPEL code can be represented abstractly in a BPM, and elements within the BPM can be described in more detail by using BPADs. In this way, a user can formally describe technical aspects of a business process, in a graphical description notation as BPMs and BPADs. BPEL-compliant XML code can be generated from BPMs and BPADs, so that web services can be invoked to implement various steps in the business process. ARIS users can also use UML as a description notation to model processes at the design specification level. In either case, the design specification description can remain independent of the implementation of functionality described in the model.

While business processes can be modeled directly in BPEL using the ARIS graphical notation, BPEL is generally a language used by technical specialists, and not by business process designers. Having technical specialists, rather than business process designers, do the business process modeling can have undesirable consequences. For example, the business process may be designed with an eye to the technical constraints faced by the technical specialists, rather than the more paramount considerations of the business process designers. In turn, this can result in a business process modeled in BPEL that does not optimally address the business needs of an organization. As a further example, an EPC may include additional information not relevant for execution, like costs and risks associated with business functions. In a similar manner, a BPEL model may contain technical details not relevant for the business expert, like technical exception handling In many cases, it is more desirable that business process designers, rather than technical specialists, do the business process modeling. This goal is most readily achieved by allowing business process designers to use a language of their choice, such as EPCs. However, once the business processes have been modeled in EPCs, they must still be manually converted into BPEL code or the like before they can actually be executed. Therefore, it is further desirable to automate the conversion of EPCs created by business process designers into executable processes, such as those implemented with BPEL code.

SUMMARY OF THE INVENTION

Consistent with certain embodiments of the invention, systems and methods are provided for transforming modeled business processes into executable processes. The modeled processes may comprise graphically modeled business processes. The executable processes may comprise processes suitable for execution by a computerized or software-based system.

Consistent with an embodiment of the invention, systems and methods are provided for transforming business processes modeled with EPCs, for example, into executable processes comprising an executing language, such as BPEL, for example. Such systems and methods may be implemented within an environment, such as the ARIS environment, as further disclosed herein. It will be appreciated, however, that embodiments and aspects of the invention may also be implemented or adapted for use within other types of environments, as well as other types of scenarios and languages, such as XPDL and ebXML.

In certain embodiments, transformation rules are provided for mapping or converting, for example, EPC model constructs to BPEL constructs. Such transformation rules may be implemented in systems and methods for creating executable process descriptions based on business process models. In cases where other executing languages are used (such as XPDL or ebXML), different sets of transformation rules may be provided.

Consistent with an embodiment of the invention, a computerized method is provided for transforming an event-driven process chain (EPC) modeled business process into an executable business process. The method may include: providing a plurality of graphical constructs in a database, the plurality of graphical constructs representing elements in the EPC modeled business process; providing a set of transformation rules in the database, the set of transformation rules including rules for converting the graphical constructs into programming constructs for the executable business process; applying the set of transformation rules to the graphical constructs to generate the executable business process comprising an ordered sequence of programming constructs; and storing the ordered sequence of programming constructs in the database for subsequent execution of the executable business process.

Consistent with an embodiment of the invention, a computer-readable medium is provided comprising programmable instructions adapted to perform a computerized method for transforming an event-driven process chain (EPC) modeled business process into an executable business process. The method may include: providing a plurality of graphical constructs in a database, the plurality of graphical constructs representing elements in the EPC modeled business process; providing a set of transformation rules in the database, the set of transformation rules including rules for converting the graphical constructs into programming constructs for the executable business process; applying the set of transformation rules to the graphical constructs to generate the executable business process comprising an ordered sequence of programming constructs; and storing the ordered sequence of programming constructs in the database for subsequent execution of the executable business process.

Consistent with an embodiment of the invention, a system is provided for transforming an event-driven process chain (EPC) modeled business process into an executable business process. The system may comprise: a database for storing a plurality of graphical constructs, the plurality of graphical constructs representing elements in the EPC modeled business process, and for storing a set of transformation rules in the database, the set of transformation rules including rules for converting the graphical constructs into programming constructs for the executable business process; and a processor for executing model transformation software. The model conversion software may comprise instructions for causing the processor to apply the set of transformation rules to the graphical constructs to generate the executable business process comprising an ordered sequence of programming constructs, and store the ordered sequence of programming constructs in the database for subsequent execution of the executable business process.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
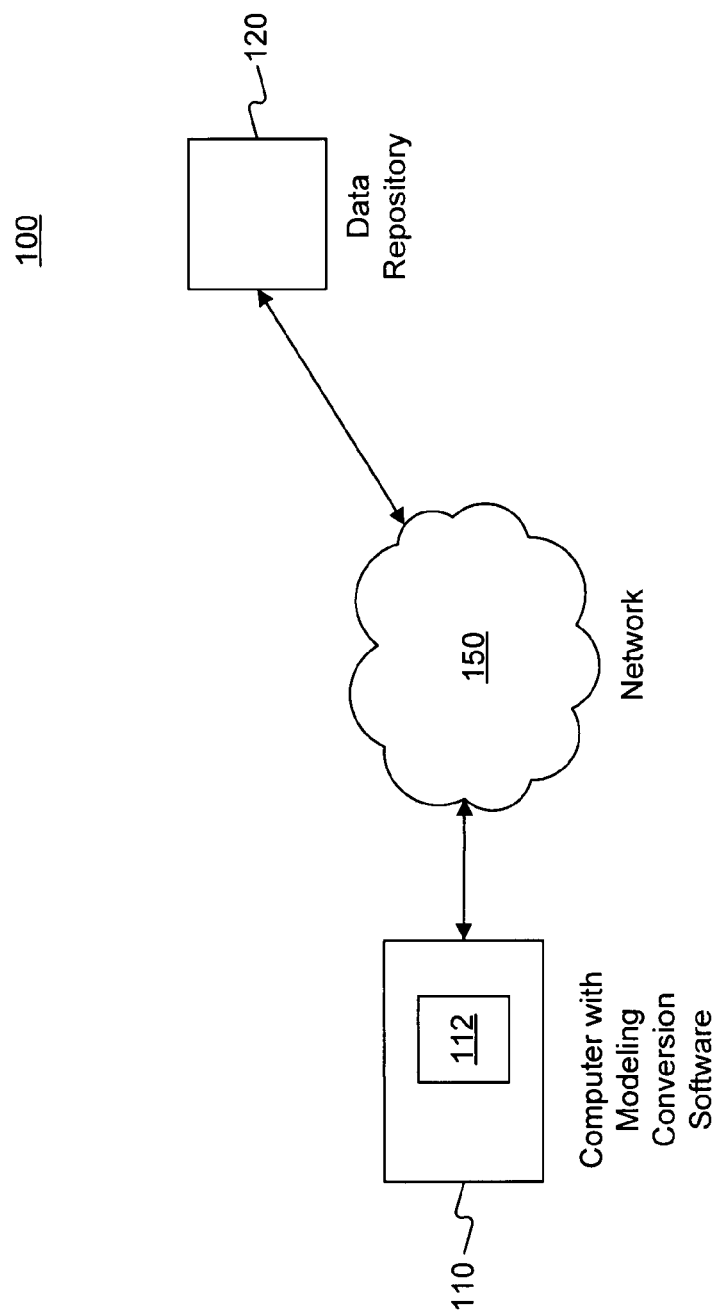
FIG. 1 illustrates a block diagram of an exemplary system environment for transforming modeled business processes, consistent with an embodiment of the invention.

Reference will now be made in detail to the exemplary embodiments of the invention, examples of which are illustrated in the accompanying drawings. Wherever possible, the same reference numbers will be used throughout the drawings to refer to the same or like parts.

Systems and methods consistent with the present invention enable the transformation of modeled business processes into executable processes. In general, any form of description notation may be utilized to describe a business process. As used herein, the term "description notation" refers to any graphical or written way of describing business information, including business processes. Examples of description notations include EPC notation, VAC notation, BPEL graphical symbols, XML, BPEL-compliant XML, and UML component diagram notation. As will be appreciated by those skilled in the art, other forms of description notation may also be used to represent business processes that processed or transformed consistent with the principles of the present invention.

To model a business process, a graphical description notation may be utilized by a business process designer to create a diagram or similar graphical representation of the business process. In such a diagram, graphical constructs such as EPC symbols may represent elements in the business process. As used herein, the term "graphical construct" refers to any combination of symbols, text, color, images, or pictures. Further, a "modeled business process" as that term is used herein means a business process that is represented by a set of graphical constructs, each of the graphical constructs being logically related to at least one other graphical construct. The logical relationships between graphical constructs may be indicative of sequence, order, conditional branching, initiation, termination, and the like as required or defined for the elements in the business process.

A modeled business process may be stored as objects in a database or memory. Such objects may represent the graphical constructs of, for example, an EPC diagram. Further, the logical relationships between the graphical constructs can be maintained as attributes of the objects corresponding to the graphical constructs. It is also possible to store annotations defined by a business process designer as attributes of the objects corresponding to the graphical constructs. The term "annotations" refers to any data, messages, or applications referenced in an EPC diagram for a specific business process.

An executable process may also be stored as objects in a database or memory. An executable process to execute a business process may be described using an executable language description notation. An "execution language description notation," as that term is used herein, refers to a description notation for execution languages, such as XML, BPEL, or WSDL (Web Services Description Language). In general, executable processes may be defined by a set of programming constructs that are stored as objects in a database or memory, with attributes such as logical relationships to other programming constructs and annotations. A "programming construct," as that term is used herein, refers to objects corresponding to execution language description notation, as well as graphical symbols representing such objects. The objects can be source code, compiled code, or executable code. In one embodiment, programming constructs are implemented through BPEL code and symbols.

For purposes of illustration, embodiments of the invention are described herein with reference to implementations using ARIS environment. As will be appreciated by one skilled in the art, however, embodiments of the invention are not limited to ARIS, and may be applied to or adapted for other environments, including computerized or software-based environments with modeling and/or graphical tools. As used herein, the term "software" encompasses any and all types of software, including computer software, computer program products, and program modules and components, including business and financial software applications and components.

FIG. 1 illustrates a block diagram of an exemplary system environment that comprises a modeling system 100, consistent with an embodiment of the invention. Modeling system 100 may include one or more computers 110 with model conversion software 112, and one or more data repositories 120. Model conversion software 112 may transform business processes modeled with EPC symbols, for example, into an executable processes comprising at least code, such as BPEL, XPDL or ebXML code.

Devices 110 and 120 can include one or more processors, storage devices, applications, and/or other hardware or software. In one embodiment, device 110 is a personal computer or laptop and device 120 is a server or another form of conventional database. Communication network 150, which can be implemented by any combination of wired or wireless technologies, allows devices 110 and 120 to communicate with one another for purposes of, for example, data retrieval and storage. Communication network 150 can be virtually any type or combination of networks, including a WAN such as the Internet, an intranet, and/or a home or office-based LAN.

For the purposes of this description, the major conceptual functions of the referenced embodiments are described herein as wholly resident on separate computers or devices. Alternative embodiments wherein the processing described on any one of devices 110 and 120 is distributed across multiple computers, processors or modules are also possible. In addition, it is possible to combine the functionality of one or more of devices 110 and 120 into one device or machine. In one exemplary embodiment, model conversion software 112 can exist entirely on a server distinct from devices 110 and 120, but accessible via network 150. For example, model conversion software 112 may run on a separate server (not shown in FIG. 1) that is connected by a LAN to data repository 120, and computer 110 may be connected by a WAN to both the server and data repository 120. As will be appreciated by those skilled in the art, other arrangements and system environments are possible in view of the teachings of the present invention.

Consistent with an embodiment, modeling system 100 may be implemented in ARIS environment. In such a case, models such as EPC business models and BPEL processes may be stored in data repository 120, in a manner consistent with the ARIS framework. The ARIS framework allows various graphical description notations, and can be extended to textual description languages as well. Models can be implemented in a graphical description notation using symbols that are defined by the notation.

Figure 2:
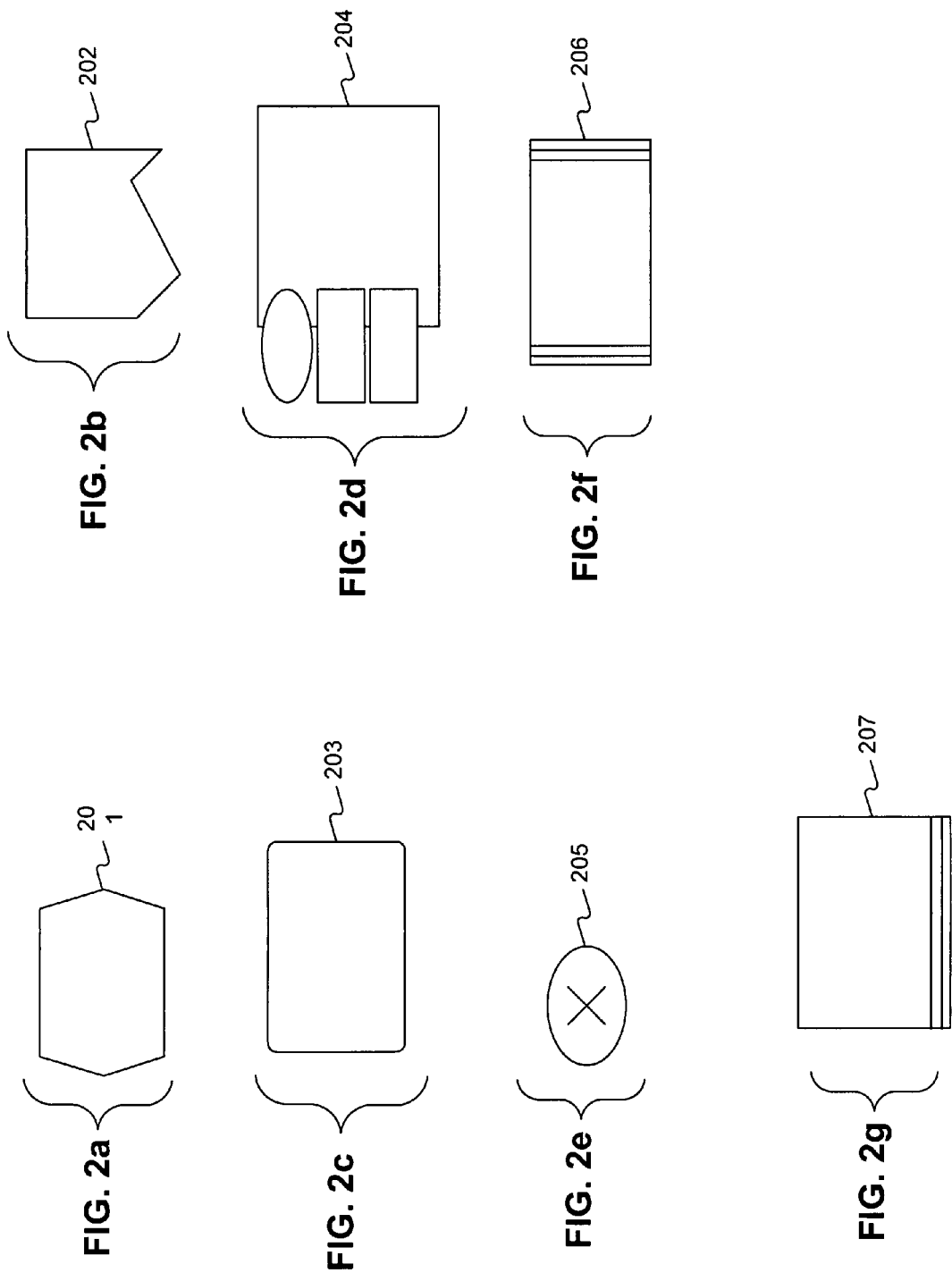
FIGS. 2A-2G illustrate exemplary ARIS EPC symbols that may used to model a business process, consistent with certain embodiments of the invention.

By way of example, ARIS EPC symbols that may used to model a business process are depicted in FIGS. 2A-G. Event symbol 201 in FIG. 2A represents an event, which indicates controlling or influencing the procedure of a business process modeled by an EPC diagram. Function symbol 203 in FIG. 2C represents a function. Predetermined events trigger functions, and are the results of functions. Unlike a function, which is a time-consuming occurrence, an event is related to one point in time. A function is a technical task or activity performed in support of one or more company objectives. Rule symbol 205 in FIG. 2E represents a rule. Rules define the logical links between the symbols they connect. Information carrier symbol 202 in FIG. 2B represents an information carrier, which describes input/output data for functions. Component symbol 204 in FIG. 2D represents a component, which describes services supporting the execution of a function. Data symbol 206 in FIG. 2F represents data, such as an input to or output of a function. Technical data object symbol 207 in FIG. 2G represents a technical data object used by a service or application.

Figure 3:
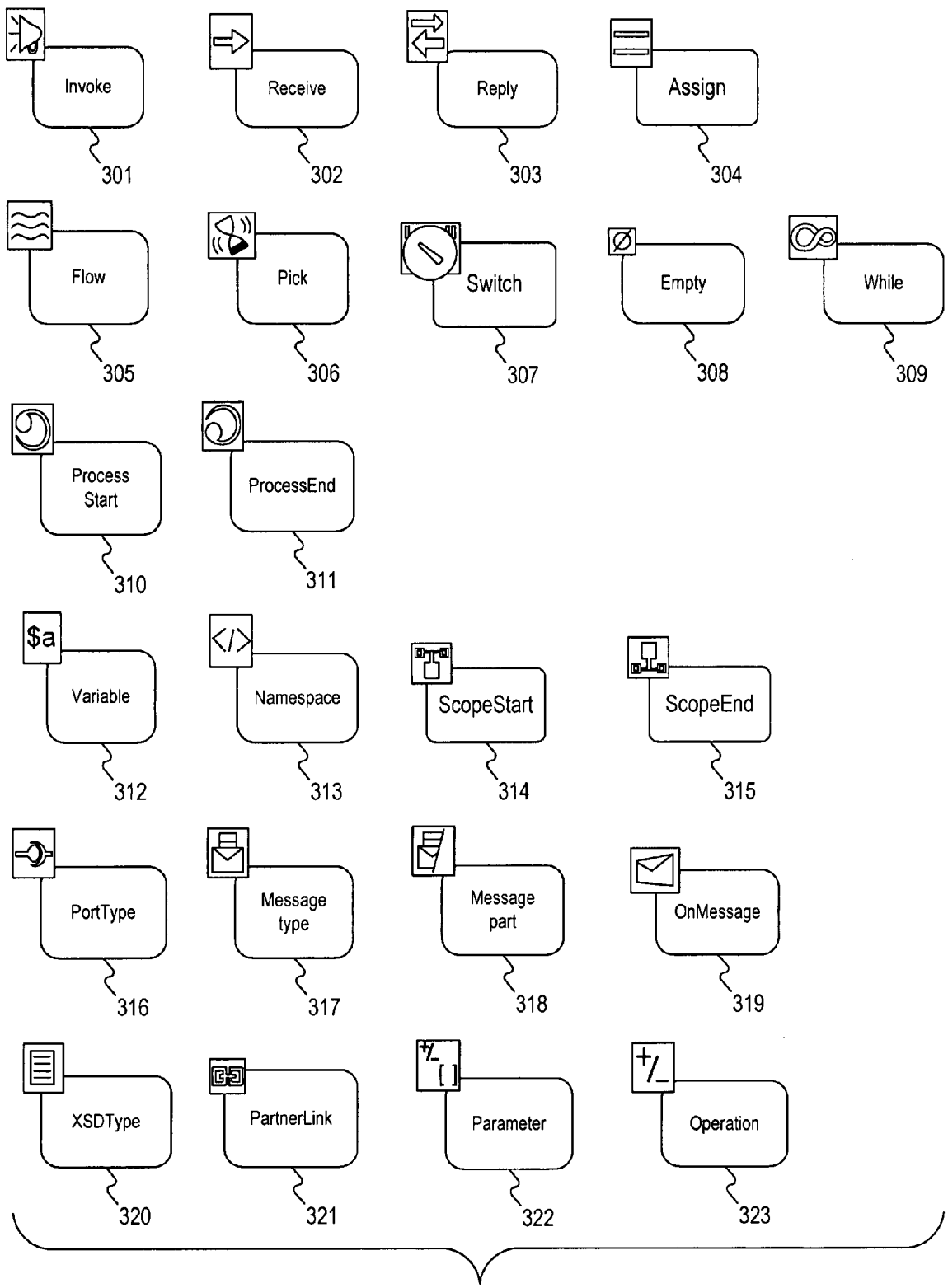
FIG. 3 illustrates exemplary ARIS BPEL symbols that may used to represent an executable process, consistent with certain embodiments of the invention.

Another example of a graphical description notation provided by ARIS is illustrated in FIG. 3. FIG. 3 depicts a number of ARIS BPEL symbols that may be used to represent an executable process. The ARIS BPEL symbols used herein are consistent with one embodiment of the invention. Other symbols can be used, such as BPEL symbols available from Oracle and IBM.

Each BPEL symbol represents a BPEL concept defined by the BPEL standard. For example, invoke symbol 301 represents invoking an operation, and is described at Chapter 11.3 of the BPEL 1.1 standard, which is available at http://dev2dev.bea.com/webservices/BPEL4WS.html and expressly incorporated herein by reference to its entirety. Receive symbol 302 represents an incoming action, as described in Chapter 11.4 of the BPEL standard. Reply symbol 303 represents an action in reply to an incoming action, and is described in Chapter 11.4 of the BPEL standard. Assign symbol 304 is an abstract depiction of an assignment and is described in Chapter 11.5 of the BPEL standard.

Flow symbol 305 represents a flow structured activity, described in the Chapter 12.5 of the BPEL standard. Flow symbol 305 may create a set of concurrent activities that are directly nested within it. Pick symbol 306 represents a structured activity pick, described in Chapter 12.4 of the BPEL standard. Pick symbol 306 may await an occurrence of a set of events, at which point an activity that is associated with the event or events may be performed. Switch symbol 307 represents a switch structured activity as described in Chapter 12.2 of the BPEL standard. Empty activity symbol 308 represents an empty basic activity, as described in Chapter 11.8 of the BPEL specification. While activity symbol 309 represents a while loop, and is described in Chapter 12.3 of the BPEL standard.

Process start symbol 310 represents the start of a BPEL process, and process end symbol 311 represents the end of a BPEL process. Variable symbol 312 represents a BPEL variable element, as described in Chapter 9.2 of the BPEL standard. Namespace symbol 313 represents an XML Namespace, as described in "Namespaces in XML", W3C, REC-xml-names-19990114, the disclosure of which is expressly incorporated herein by reference to its entirety. Scope start symbol 314 represents the beginning of a scope within a BPEL process, and scope end symbol 315 represents the end of a scope within a BPEL process. Scope is described in Chapter 13 of the BPEL standard.

PortType symbol 316 may represent a WSDL (Web Services Description Language) port type and may include an icon that resembles an interface as a connection point of between two entities. Port types are described in the Chapter 2.4 of W3C WSDL 1.1, which is available at http://www.w3.org/TR/wsd and expressly incorporated herein by reference to its entirety. Message type symbol 317 relates to a WSDL message and may include an icon that resembles an envelope with a text document, thereby reflecting a relationship with an "XSDType" symbol. Message types are described in Chapter 2.3 of W3C WSDL 1.1. Message part symbol 318 represents part of a WSDL Message, as described in the Chapter 2.3.1 of W3C WSDL 1.1. OnMessage symbol 319 an incoming message as a definition of an event handler part within a BPEL process, and is described in Chapter 13.5.1 of the BPEL standard.

XSDType symbol 320 represents an XSD type, as described in the Chapter 3 of W3C, REC-xmlschema-1-20041028, which is expressly incorporated herein by reference to its entirety. XSDTypes can define the payload of a Message Part, the Message Part being part of a Message Type. Partnerlink symbol 321 represents a partner, as described in the Chapter 7.3 of the BPEL standard. Parameter symbol 322 represents a parameter of a WSDL operation, as described in Chapter 2.4 of W3C WSDL 1.1. Operation symbol 323 represents an operation of a WSDL port type, as described in Chapter 2.4 of W3C WSDL 1.1.

Each of the BPEL symbols depicted in FIG. 3 corresponds to a BPEL concept described in the standard. Other BPEL symbols may also be provided, such as those defined in ARIS, but are not shown in FIG. 3.

A business process designer can create an EPC model using computer 110. In one embodiment, a diagram of the EPC model can be created using computer 110. Computer 110 may include modeling tools, including graphical user interfaces that assist a business process designer in selecting EPC symbols, such as those illustrated in FIGS. 2A-2G, to create to a diagram of the modeled business process. The EPC diagram may be stored as objects in computer 110 and/or data repository 120. Computer 110 may also permit a business process designer to retrieve, view and/or modify stored EPC models stored in memory.

Consistent with the present invention, a business process designer can transform EPC diagrams into BPEL executable processes using model conversion software 112, which implements a set of transformation rules. The transformation rules include rules that indicate how to convert EPC symbols and, ultimately, express graphical constructs that appear in an EPC diagram into programming constructs (comprising BPEL code) for an executable process. When transforming a modeled business process into an executable process, logical relationships and annotations appearing in the EPC diagram may also be interpreted and transformed to provide corresponding information (i.e., transformed logical relationships and annotations) for the programming constructs of the executable process.

In one embodiment, an executable process comprising BPEL code may be graphically represented by BPEL symbols. When displayed as part of a diagram, the BPEL symbols may enable a designer to more quickly comprehend the underlying BPEL code for the executable process. Systems and methods for graphically representing BPEL code through BPEL symbols are described in U.S. Patent Publication No. US-2007-0005618-A1.

Processes described in BPEL can be used as executable services when they are in accordance with the WSDL standard. In such a case, business processes should be modeled with WSDL definitions that can subsequently be used when creating the executable processes. Examples of such WSDL definitions include the interfaces exposed by a web service (portTypes), parameter types used as inputs and outputs for the web service (messageTypes), and the type of payload (such as an XSD type) used by the message type.

Executable BPEL processes generated from an EPC model can be either synchronous or asynchronous, depending on the number of start and end events in the business process modeled in the EPC. If there is only a single start and single end event in the EPC, only a synchronous BPEL process can be generated. So long as there is at least one start event and at least one end event in the EPC, an asynchronous BPEL process can be generated.

A synchronous BPEL process can be represented with one interface using a single request-response WSDL operation. In one embodiment, the input to the synchronous BPEL process is a process incoming process message, and the output of the synchronous BPEL process is a process outgoing message.

An asynchronous BPEL process can be represented with two interfaces, an interface for incoming messages and an interface for outgoing messages. In one embodiment, the interface for incoming messages can contain an operation for each business process start event. In addition, the interface for outgoing messages (known as a "callback") can contain an operation for each business process end event.

Transforming from a business process modeled in an EPC to an executable process in BPEL can be done based on workflow patterns. A set of transformation rules for such transformations should consider the specifics and limitations of both EPC as business process notation and BPEL as an executable process language. Other sets of transformation rules may also be provided to address alternate forms of executable process languages, such as XPDL or ebXML.

Figure 4:
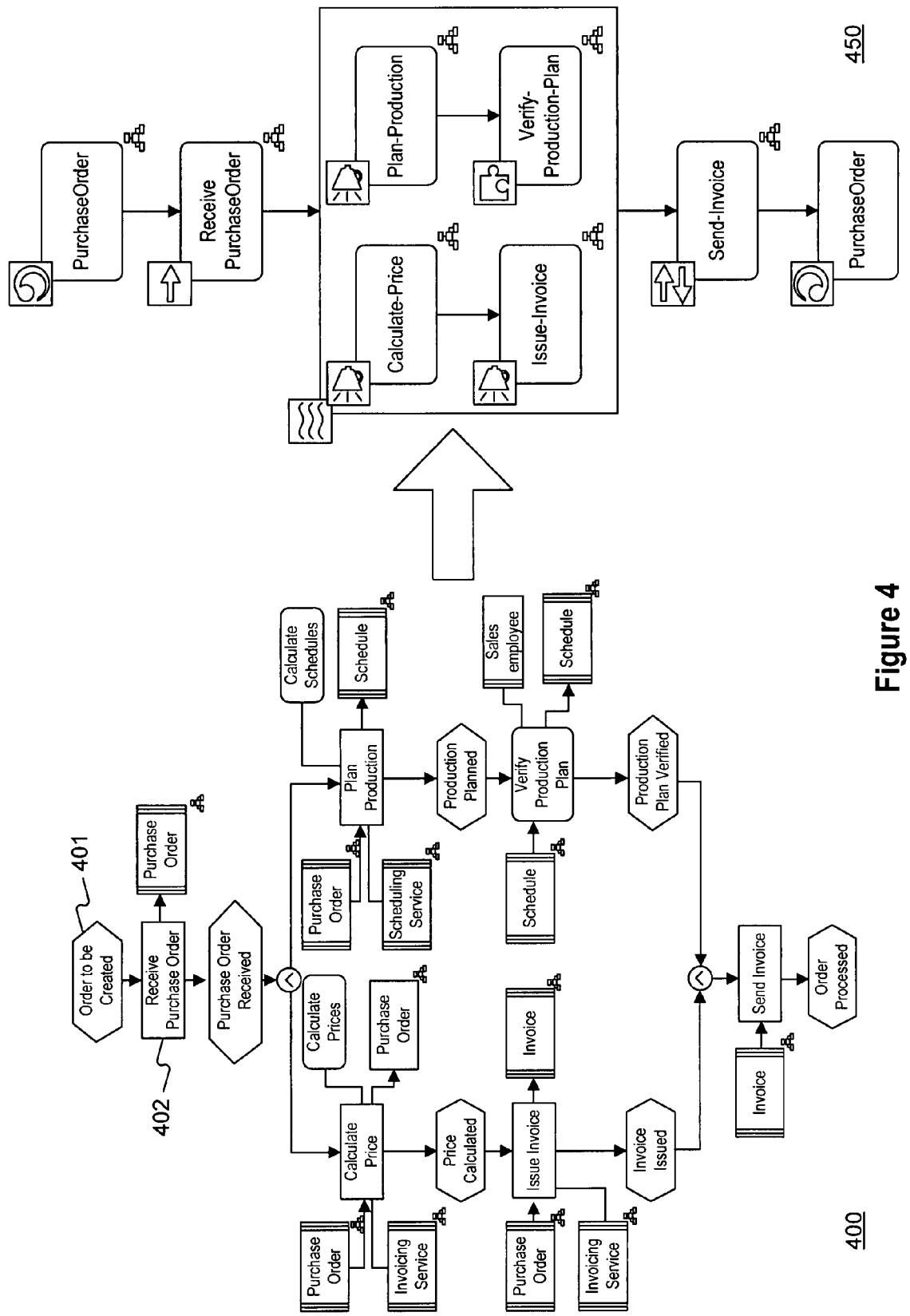
FIG. 4 illustrates an exemplary transformation of an EPC model into a BPEL process, consistent with an embodiment of the invention.

To provide further illustration of the transformations that may be achieved through the principles of the present invention, reference will now be made to FIG. 4. FIG. 4 shows an exemplary transformation of a modeled business process (EPC 400) into an executable process (BPEL process 450). As shown in FIG. 4, EPC 400 includes events such as create order event 401 reflecting an external trigger, and process steps such as receive purchase order step 402, reflecting internal triggers. EPC 400, thus, reflects a modeled business process that operates upon process events. Consistent with the present invention, EPC 400 can be transformed into a BPEL process 450 using a set of transformation rules. Examples of transformation rules are provided below with respect to EPC and BPEL constructs.

An EPC model may contain several types of process steps that can correspond to a number of functions, such as: (1) an "orchestration process step" for orchestrating an existing supporting service (such as a web service), (2) a "manual activity" step corresponding a function carried out by a given organizational element, (3) a "process messaging activity" or "PMA" for defining incoming and outgoing process messages, or (4) a "manual activity with supporting software," which is simply a manual activity that is supported by another application or service.

Based on the logical relationships in a given EPC, several distinct transformation rules may be provided. First, an orchestration process step or process messaging activity process step can have an "input for" relationship, and this can be converted into a BPEL Invoke activity that calls a one way operation of an orchestrated service. Second, an orchestration process step can have both an "input for" and "output for" relationships, and can be converted into a BPEL Invoke activity that calls a request-response operation of an orchestrated service. Third, an orchestration process step or process messaging activity process step can have an "output for" relationship, and can be converted to a BPEL Receive activity that receives information from an external service. Forth, a manual activity process step or manual activity with supporting software process step can be converted to an ARIS BPEL Extension Activity.

Generally, EPCs start and end with events that trigger the business process itself or operations within the business process. Because BPEL executes as an event driven process, BPEL and EPC logic match quite well. However, in an executable process such as BPEL, an event is a message, either incoming or outgoing, to or from a consumer of the process. This implies that a business process which serves as a basis for an executable process should specify what data is contained in the message corresponding to the start or end event. Messages sent by a process to an orchestrated service or received from an orchestrated service can be implicitly specified using input\output relationships of process steps.

When transforming business process start and end events into executable processes, two modeling conventions can be used. The first convention involves "explicit" PMA's, where incoming and outgoing messages can be defined as EPC functions. Each path in an EPC following this convention should either start with an event followed by a process messaging activity, or end with an event preceded by a process messaging activity. An explicit PMA should not be supported by any services or carried out by any organizational elements. The second convention involves "implicit" PMA's, where incoming and outgoing messages can be defined at EPC start and end events. In EPC's which follow this convention, each path in the EPC can start or end with an event and a data object attached to the event.

Figure 5:
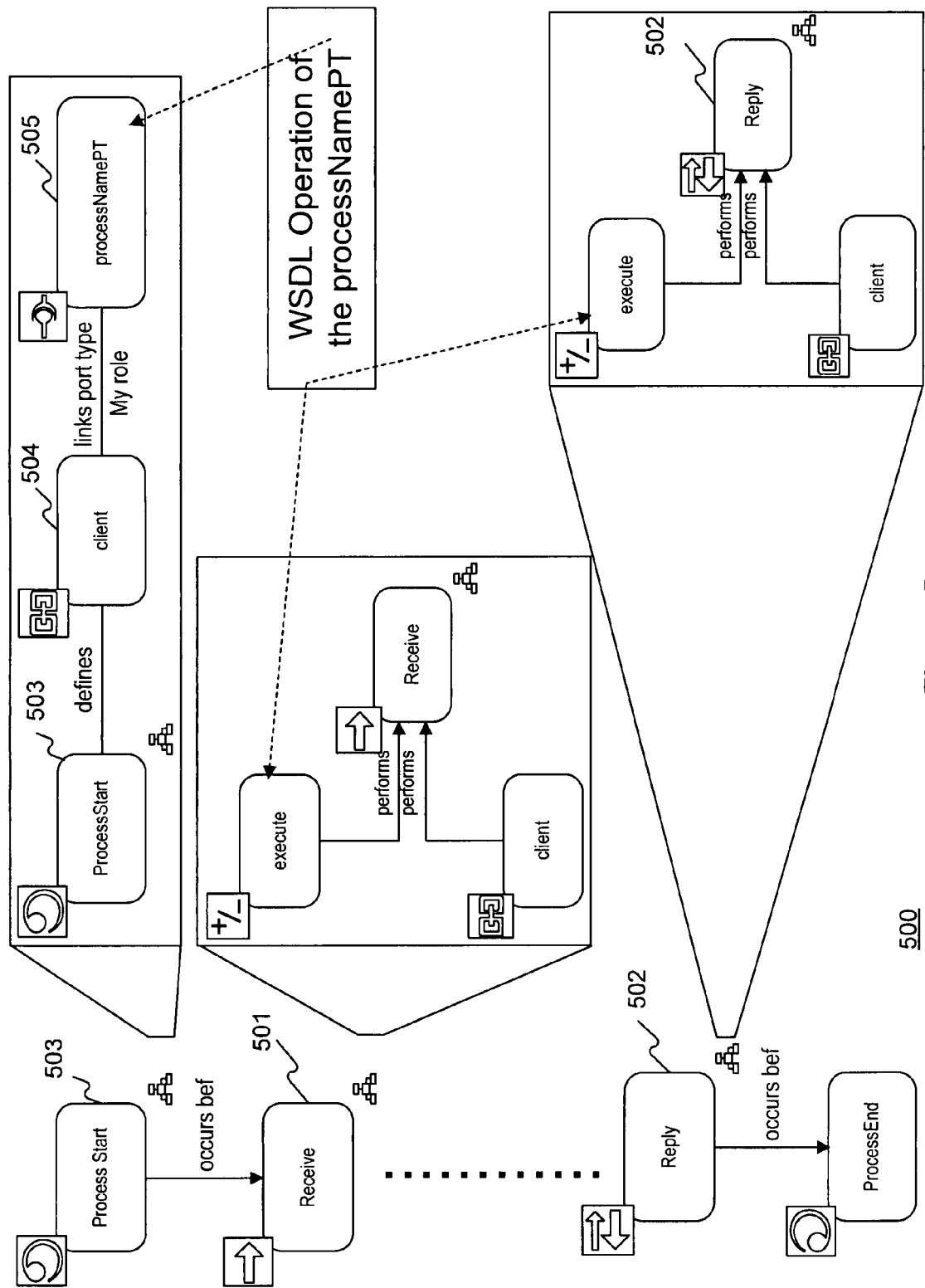
FIG. 5 illustrates an exemplary BPEL process, consistent with an embodiment of the invention.

As shown in the example of FIG. 5, a synchronous BPEL process 500 can be generated when there is a single start event and a single end event in the corresponding business process EPC. As described below, a transformation rule for converting an EPC with a single start and single end event can represent the EPC as synchronous BPEL process 500, with a Receive BPEL activity 501 at the start and a Reply BPEL activity 502 at the end of BPEL process 500.

A BPEL object ProcessStart 503 can be connected with a client Partner Link 504. Client Partner Link 504 represents a communication link with a consumer of BPEL process 500, when BPEL process 500 is executed. Client PartnerLink 504 is connected with a Port Type symbol 505 that represents a BPEL process interface. A receive BPEL symbol 501 is connected with client PartnerLink symbol 504, and a reply BPEL symbol 502. Receive symbol 501 produces an output to a variable (not shown). A type of this variable is a message type, which payload is of the same data type that can be specified either directly or indirectly in a start event of a business process associated with BPEL process 500. Reply symbol 502 is connected with client PartnerLink 504, and consumes an input from a variable. A type of this variable is a message type, which payload is of the same data type specified either directly or indirectly in an end event of the associated business process. The "CreateInstance" attribute of the object corresponding to receive BPEL symbol 501 is set to yes, and the "MyRole" attribute is maintained on a connection between objects corresponding to client PartnerLink 504 and Port Type 505.

An asynchronous BPEL process can be generated when there is at least one start and at least one end event in the business process. As described below, a transformation rule for modeling such an EPC can create an asynchronous BPEL process that starts with one or more Receive BPEL activity objects and one or more Invoke BPEL activity objects at the end of each path of the BPEL process.

Figure 6:
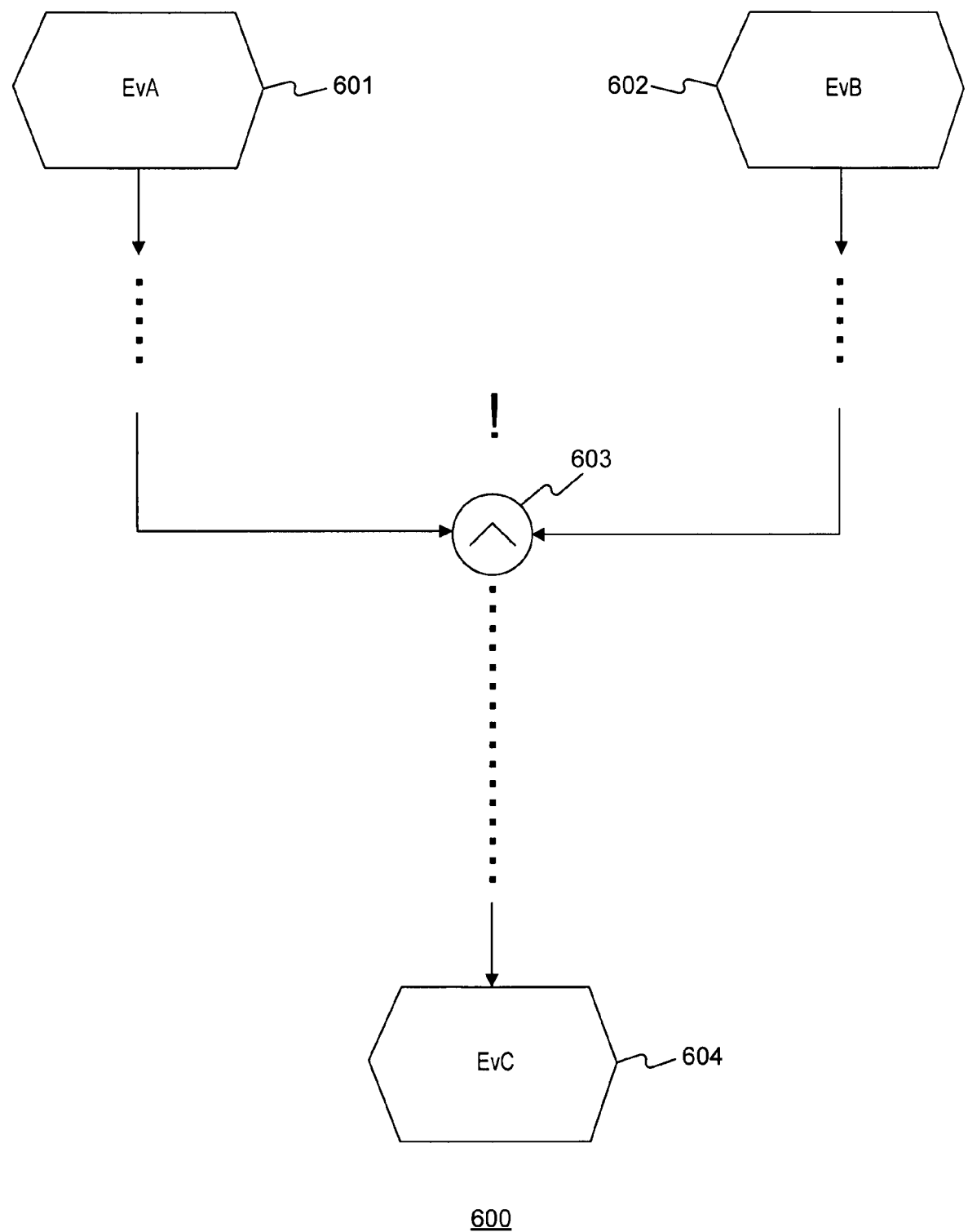
FIG. 6 illustrates an exemplary EPC model, consistent with an embodiment of the invention.
Figure 7:
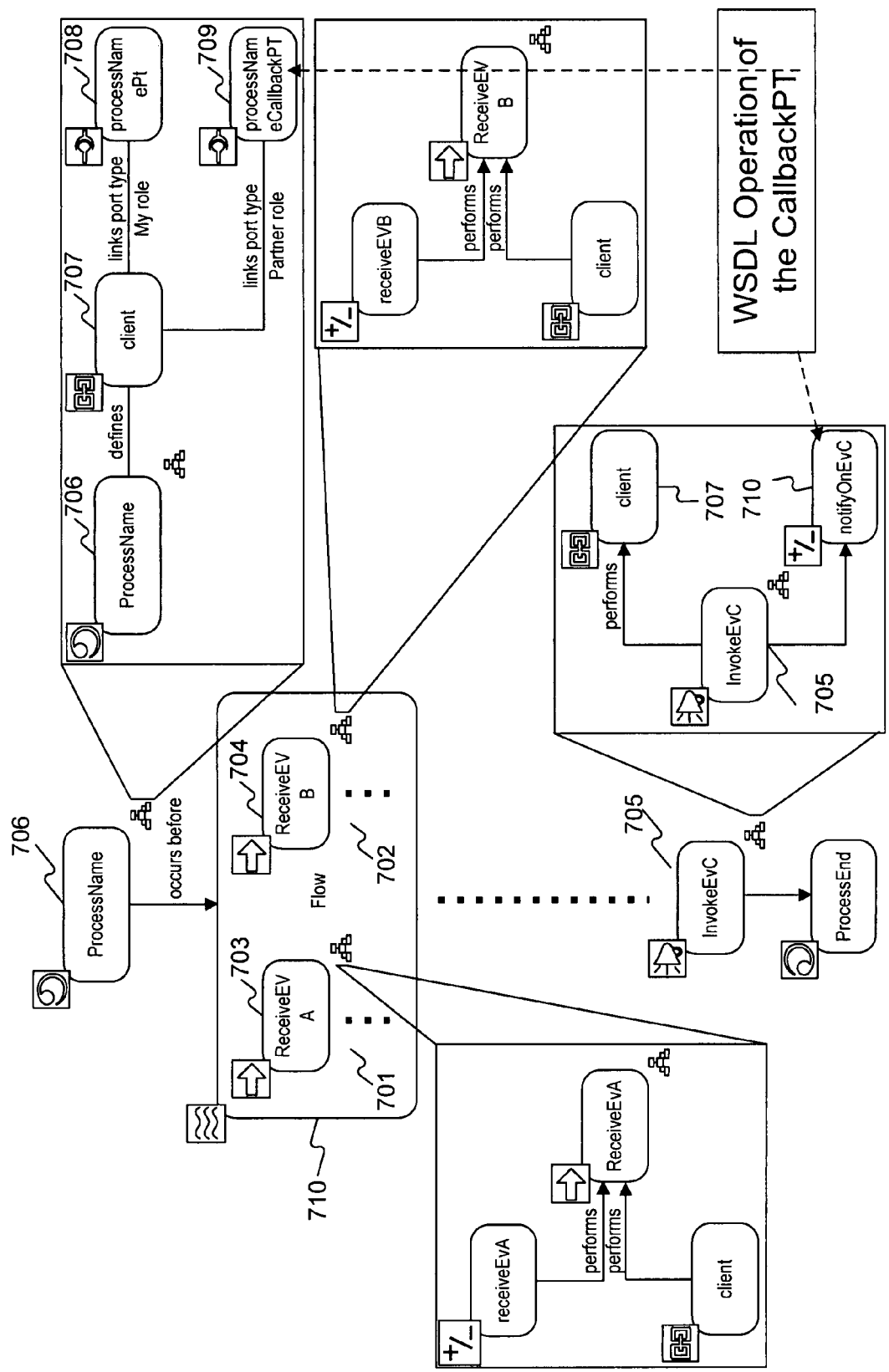
FIG. 7 illustrates an exemplary BPEL process, consistent with an embodiment of the invention.

FIG. 6 illustrates an exemplary diagram of an EPC model 600. Start event 601 and start event 602 are joined by AND operator 603. By applying a set of transformation rules, asynchronous BPEL process 700, shown in FIG. 7, may be automatically generated based on EPC diagram 600. BPEL process 700 contains flow BPEL activity 710, which contains subpath 701 and subpath 702, both of which are initiated by corresponding incoming start events 601 and 602. Subpath 701 starts with receive BPEL activity 703, and subpath 702 starts with receive BPEL activity 704. After receive BPEL activities 703 and 704, but within flow BPEL activity 710, process parts can be placed in subpaths 701 and 702. BPEL process 700 ends with Invoke BPEL activity 705, which corresponds to end event 604 in EPC diagram 600.

BPEL object ProcessStart 706 is connected with client PartnerLink 707. Client PartnerLink 707 represents a communication link with a consumer of BPEL process 700. Client PartnerLink 707 is connected with process port type 708, which represents a process interface, and callback port type 709, which represents a callback interface. Receive BPEL activity 703 and receive BPEL activity 704 are each connected to client PartnerLink 707. Receive BPEL activity 703 and receive BPEL activity 704 are also each connected with operations corresponding to events represented as start events 601 and 602, respectively.

Receive BPEL activity 703 and receive BPEL activity 704 each produce an output to variables. Types of these variables are message types, whose payload is of the same data types specified either directly or indirectly in start events 601 and 602. In turn, start events 601 and 602 correspond to Receive BPEL activity 703 and receive BPEL activity 704, respectively. Invoke BPEL activity 705 is connected to client PartnerLink 707 and operation 710 of the process callback interface, which corresponds to end event 604 in EPC diagram 600.

Invoke BPEL activity 705 consumes an input from a variable. A type of this variable is a message type, whose payload is of the same data type specified either directly or indirectly in end event 604 of EPC diagram 600. The type specified in end event 604 can correspond to a technical data object used to with technical service operations (such as web service operations). The createInstance attribute of the objects corresponding to Receive BPEL activities 703 and 704 are set to "yes." The "MyRole" attribute is maintained on a connection between objects corresponding to client PartnerLink 707 and process port type 708. The "Partner role" attribute is maintained on a connection between objects corresponding to PartnerLink 707 and callback port type 709.

In the example of FIG. 6, a business process model such as EPC 600 assumes that AND operator 603 is a single sink from BOTH start event 601 and start event 602. Thus, there is no additional end node in a path starting with either start event 601 or start event 602. Start events can be added to EPC diagram 600 later in the process flow, which can be automatically transformed into nested constructs that can be added to BPEL process 700 (see FIG. 7).

Figure 8:
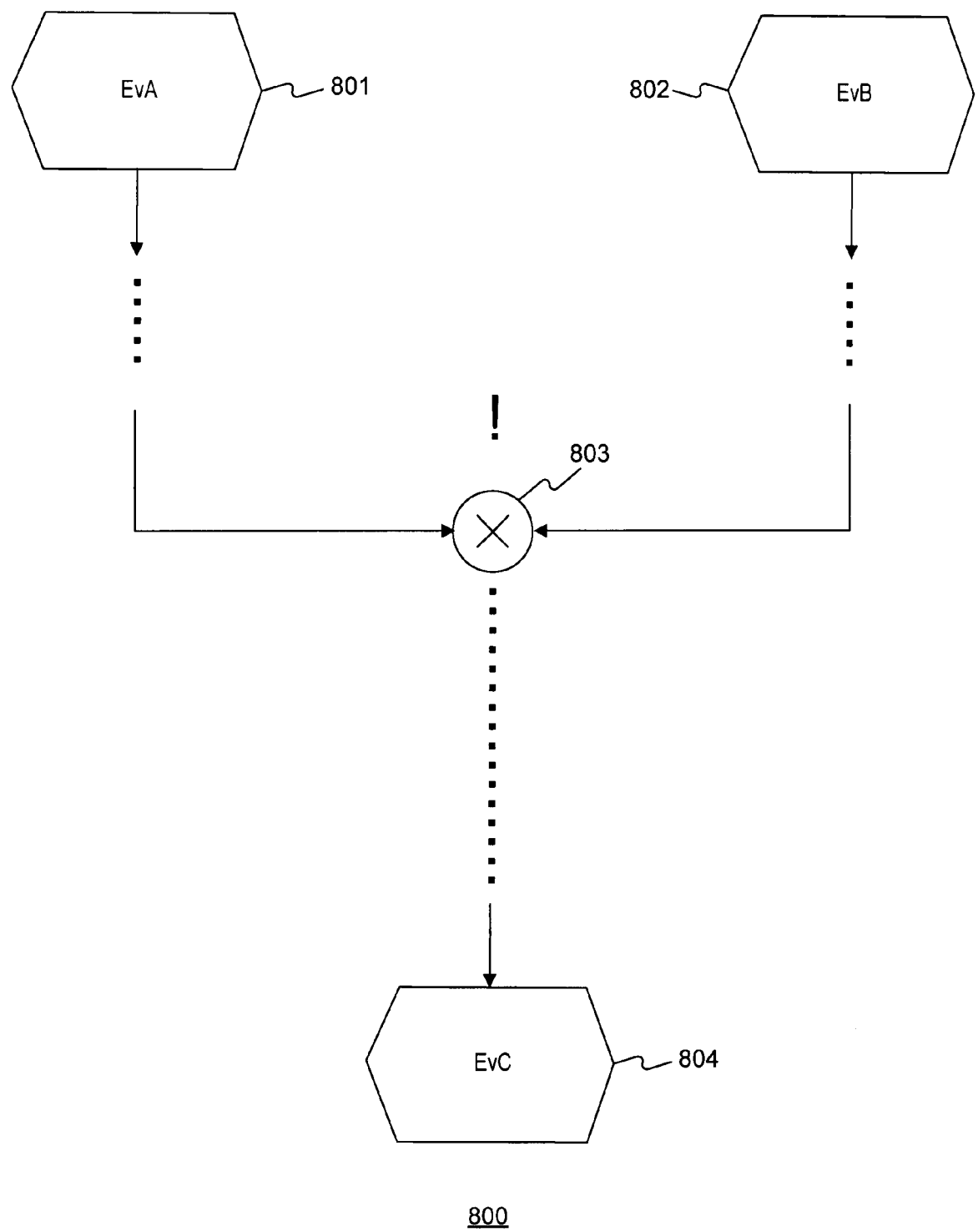
FIG. 8 illustrates an exemplary EPC model, consistent with an embodiment of the invention.
Figure 9:
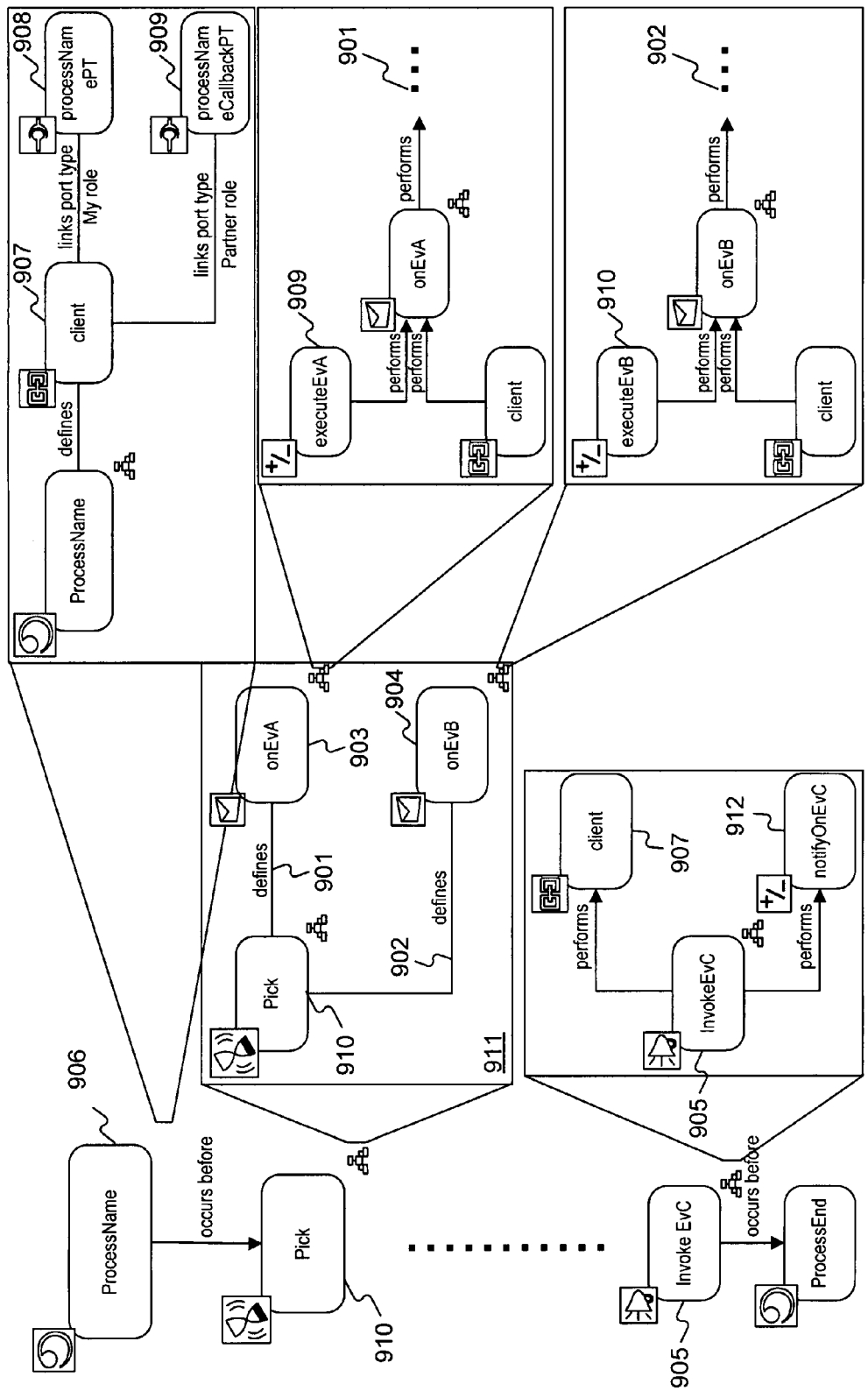
FIG. 9 illustrates an exemplary BPEL process, consistent with an embodiment of the invention.

For purposes of further illustration, reference will now be made to FIGS. 8 and 9. FIG. 8 shows an exemplary EPC diagram 800. Start event 801 and start event 802 are joined joint by XOR operator 803. Asynchronous BPEL process 900, shown in the example of FIG. 9, is automatically generated based on EPC diagram 800. BPEL process 900 contains Pick BPEL activity 910, which contains subpath 901 and subpath 902, both of which are initiated by corresponding incoming events within Pick BPEL activity 910. Subpath 901 is represented by onMessage BPEL activity 903, and subpath 902 is represented by onMessage BPEL activity 904. Subpaths 901 and 902 are illustrated as BPEL allocation diagrams, and are executed on arrival of messages corresponding to onMessage BPEL activities 903 and 904, respectively. BPEL process 900 ends with Invoke BPEL activity 905, which corresponds to end event 804 in EPC diagram 800.

BPEL object ProcessStart 906 is connected with client PartnerLink 907. Client PartnerLink 907 represents a communication link with a consumer of BPEL process 900. Client PartnerLink 907 is connected with PortType 908, which represents a process interface, and a PortType 909, which represents a callback interface. Pick BPEL activity 910 has a BPEL Allocation Diagram 911 containing onMessage BPEL activities 903 and 904. Subpaths 901 and 902 illustrate the details of onMessage BPEL activities 903 and 904, respectively. onMessage BPEL activities 903 and 904 are connected with client PartnerLink 907. onMessage BPEL activities 903 and 904 are also connected with operations 909 and 910. onMessage BPEL activities 903 and 904 correspond, respectively, to start event 801 and 802, respectively.

onMessage BPEL activities 903 and 904 each produce an output to variables. Types of these variables are message types, whose payload is of the same data types specified either directly or indirectly in start events 801 and 802. Each onMessage BPEL activity connects a subprocess that comes after the incoming event and precedes the XOR. Invoke BPEL activity 905 is connected to client PartnerLink 907 and operation 912 of the process callback. Operation 912 corresponds to end event 804 in EPC diagram 800.

Invoke BPEL activity 905 consumes an input from a variable an input from a variable. A type of this variable is a message type, whose payload is of the same data type specified either directly or indirectly in end event 804 of EPC diagram 800. The "createInstance" attribute of the object corresponding to Pick BPEL activity 910 is set to yes. The "MyRole" attribute is maintained on a connection between objects corresponding to client PartnerLink 907 and callback port type 909.

If an EPC diagram contains a start event without any functions between an event and an operator, a corresponding empty BPEL Activity can be generated as a subpath of the corresponding onMessage BPEL activity. A business process model such as EPC 800 assumes that XOR operator 803 is a single sink from both start event 801 and start event 802. Thus, there are no additional end nodes in a path starting with either start event 801 or start event 802.

Figure 10:
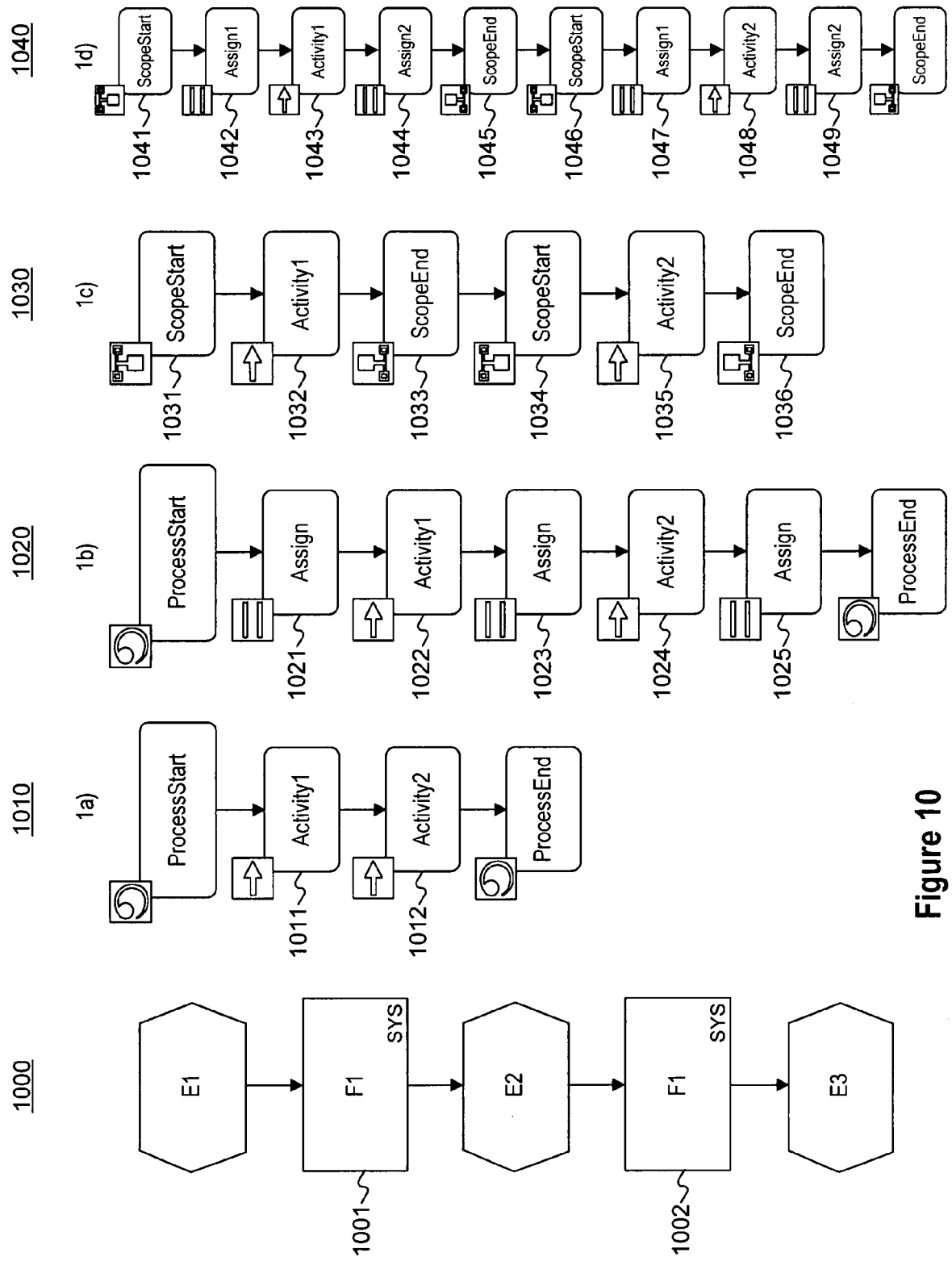
FIG. 10 illustrates exemplary transformations of an EPC model into BPEL processes, consistent with certain embodiments of the invention.

FIG. 10 illustrates additional examples of EPC to BPEL transformation rules, consistent with certain embodiments of the invention. EPC diagram 1000 can be automatically converted into each of BPEL processes 1010, 1020, 1030, and 1040 based on different transformation rules. For example, EPC diagram 1000 can be automatically converted into BPEL process 1010, by converting step 1001 into BPEL activity 1011, and converting step 1002 into BPEL activity 1012. EPC diagram 1000 can also be converted into BPEL process 1020, by converting step 1001 into start assign 1021, activity 1022, shared assign 1023, and converting step 1002 into shared assign 1023, activity 1024 and end assign 1025. EPC diagram 1000 can also be converted into BPEL process 1030, by converting step 1001 into scope start 1031, activity 1032, and scope end 1033, and converting step 1002 into scope start 1034, activity 1035, and scope end 1036. EPC diagram 1000 can also be converted into BPEL process 1040, by converting step 1001 into scope start 1041, start assign 1042, activity 1043, end assign 1044, and scope end 1045, and converting step 1002 into scope start 1046, start assign 1047, activity 1048 end assign 1049, and scope end 1050.

Figure 11:
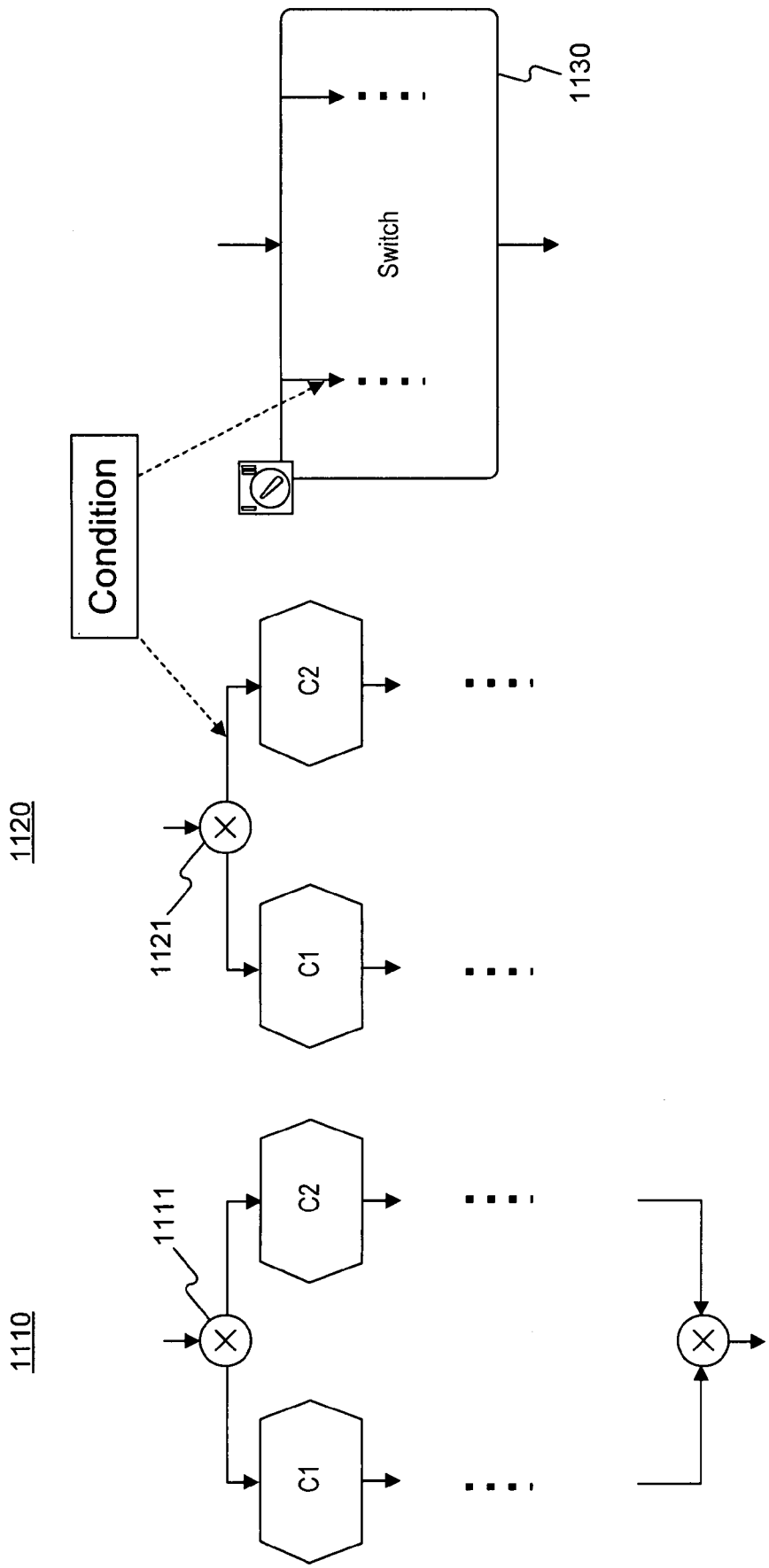
FIG. 11 illustrates an exemplary transformation of an EPC model into a BPEL process, consistent with an embodiment of the invention.

As shown in the example of FIG. 11, exclusive choice workflow patterns can be modeled as closed decision EPC diagram 1110, or implicitly closed decision EPC diagram 1120. A transformation rule for closed decision EPC diagram 1110 and implicitly closed decision EPC diagram 1120 can result in a BPEL process that includes BPEL switch 1130. Conditions can be maintained as attributes of outgoing connections of objects corresponding to XOR operators 1111 and 1121 and copied into the conditions on each path of BPEL switch 1130. A decision path with no business process steps in an EPC diagram can be represented with an Empty activity in BPEL.

Figure 12:
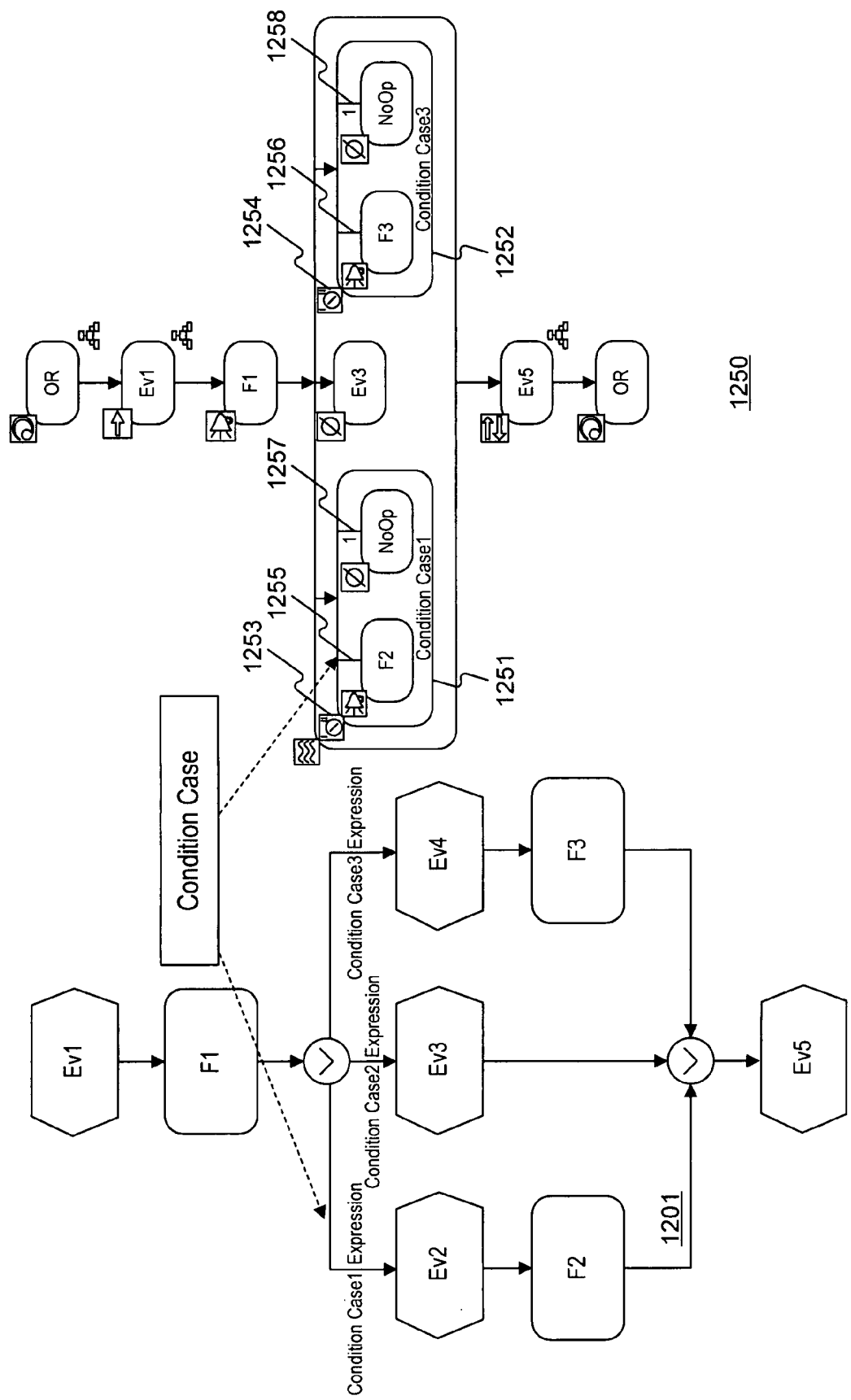
FIG. 12 illustrates an exemplary transformation of an EPC model into a BPEL process, consistent with an embodiment of the invention.

As shown in FIG. 12, a multi-choice workflow pattern can be represented as an inclusive decision 1201 in EPC 1200. In both cases inclusive decision 1201 can correspond to a conversion rule that produces a BPEL process with a combination of Flow and Switch BPEL activities, as shown in condition case 1251 and condition case 1252.

Paths in inclusive decision 1201 may be separately converted by appropriate transformation rules into Switch BPEL activities 1253 and 1254, each of which contains two paths. Paths 1255 and 1256 correspond to the corresponding business process part and paths 1257 and 1258 consist only of Empty BPEL activities. If an inclusive decision in an EPC contains no business process steps, the path can be transformed into separate Empty BPEL activities. Both Switch BPEL activities (created out of paths with business process steps) and Empty BPEL activities (created out of paths without business process steps) can be combined to form independent paths within a Flow BPEL activity.

Figure 13:
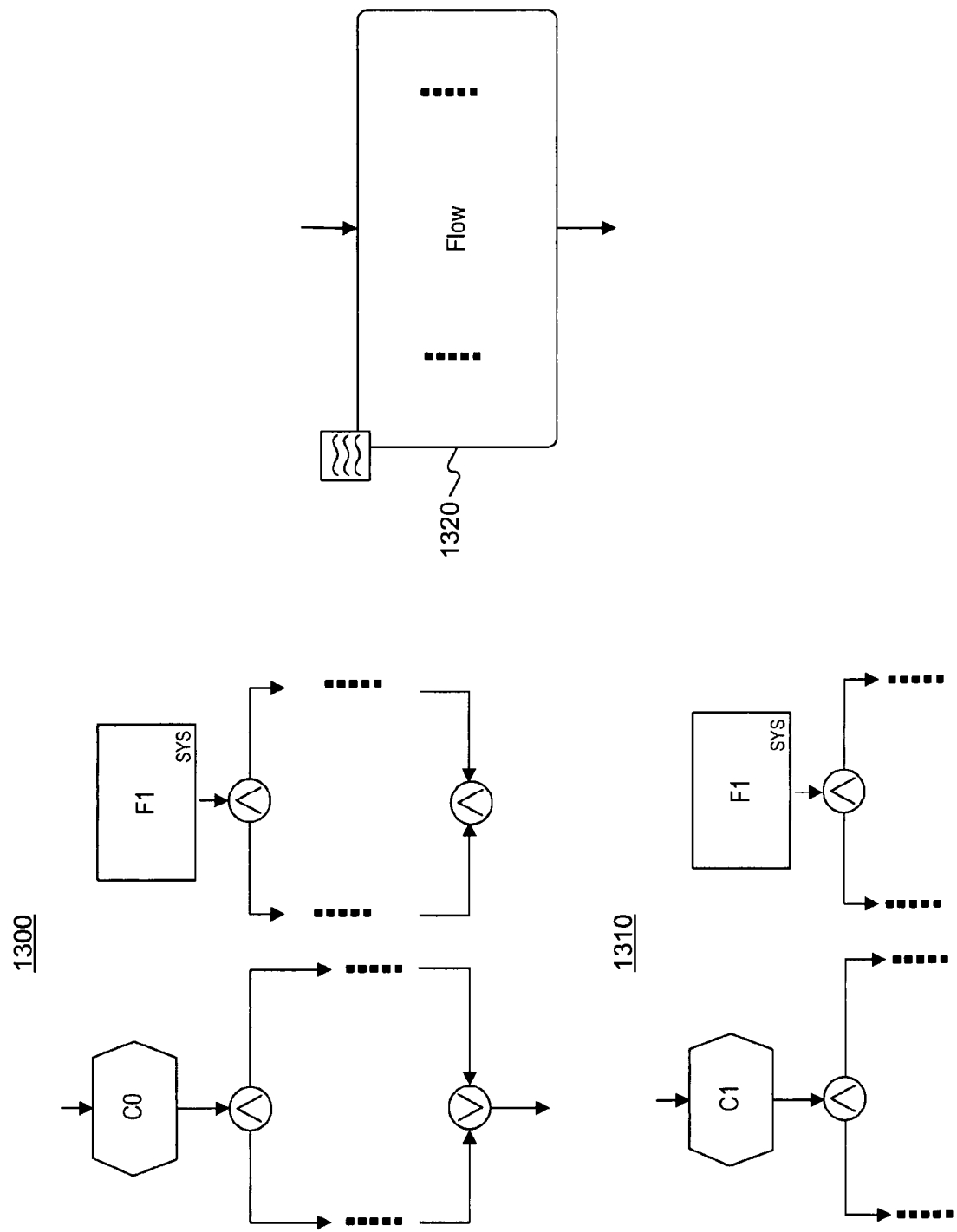
FIG. 13 illustrates an exemplary transformation of an EPC model into a BPEL process, consistent with an embodiment of the invention.

As shown in the example of FIG. 13, simultaneously executed process steps such as shown in closed parallel flow EPC diagram 1300 and implicitly closed parallel flow EPC diagram 1310 correspond to a parallel split workflow pattern, and can be followed by a synchronization workflow pattern (closed parallel flow) or not (implicitly closed parallel flow). Both closed parallel flow EPC diagram 1300 and implicitly closed parallel flow EPC diagram 1310 can be applied to a transformation rule that produces Flow BPEL activity 1320.

Figure 14:
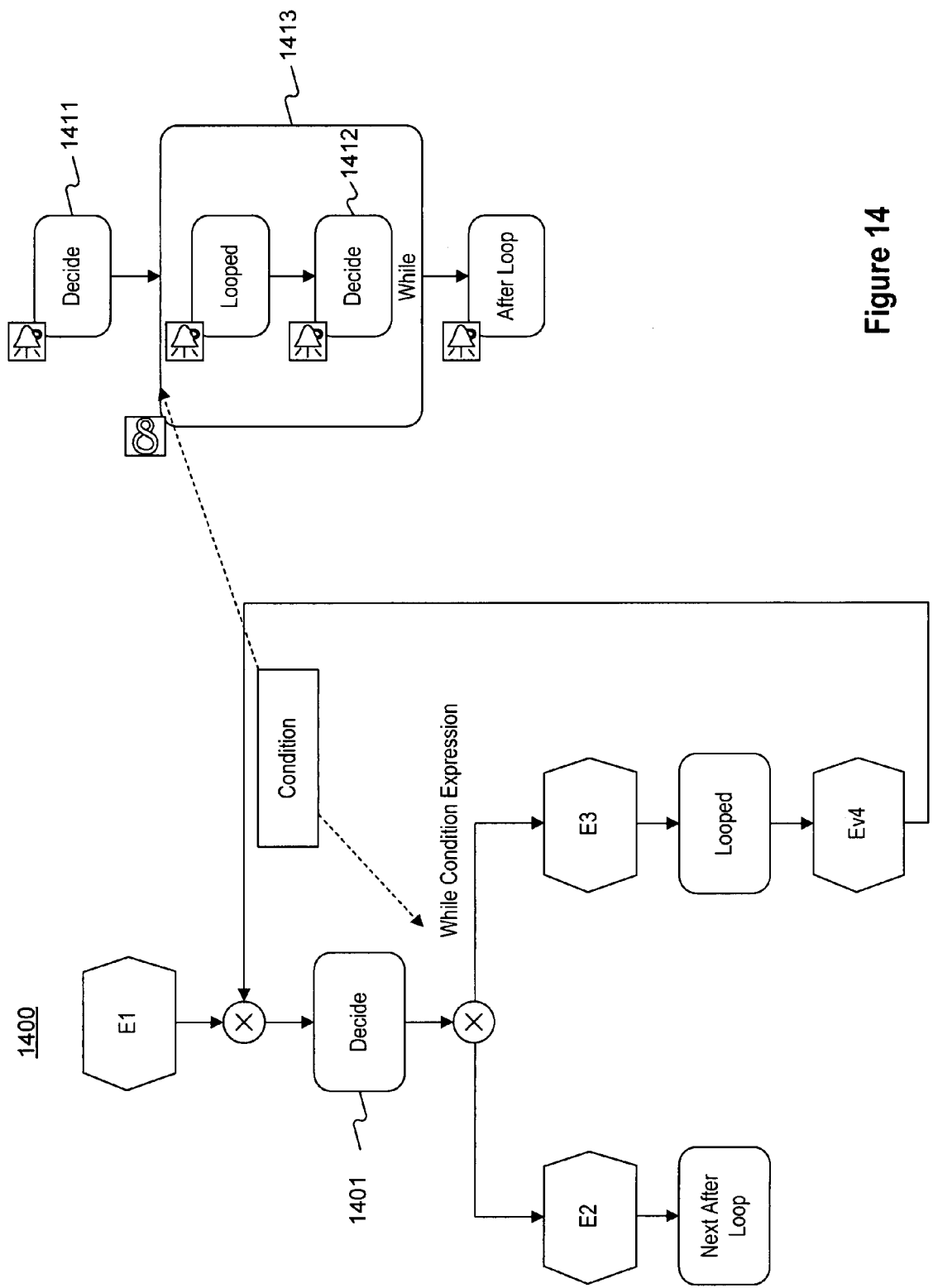
FIG. 14 illustrates an exemplary transformation of an EPC model into a BPEL process, consistent with an embodiment of the invention.

As shown in the example of FIG. 14, a while loop can be mapped only with redundant BPEL code, because there is no exactly equivalent construct available in BPEL. Thus, according to a transformation rule for a while loop, decision step 1401 in EPC diagram 1400 is mapped twice. In particular, decision step 1401 is mapped as both decide BPEL activity 1411 and decide BPEL activity 1412. Decide BPEL activity 1411 occurs once before while BPEL activity 1413, and Decide BPEL activity 1412 occurs after looped activities within while BPEL activity 1413 itself. A loop condition of the loop can be stored with decision step 1401, and set as the "Path condition" attribute of While BPEL activity 1413.

Figure 15:
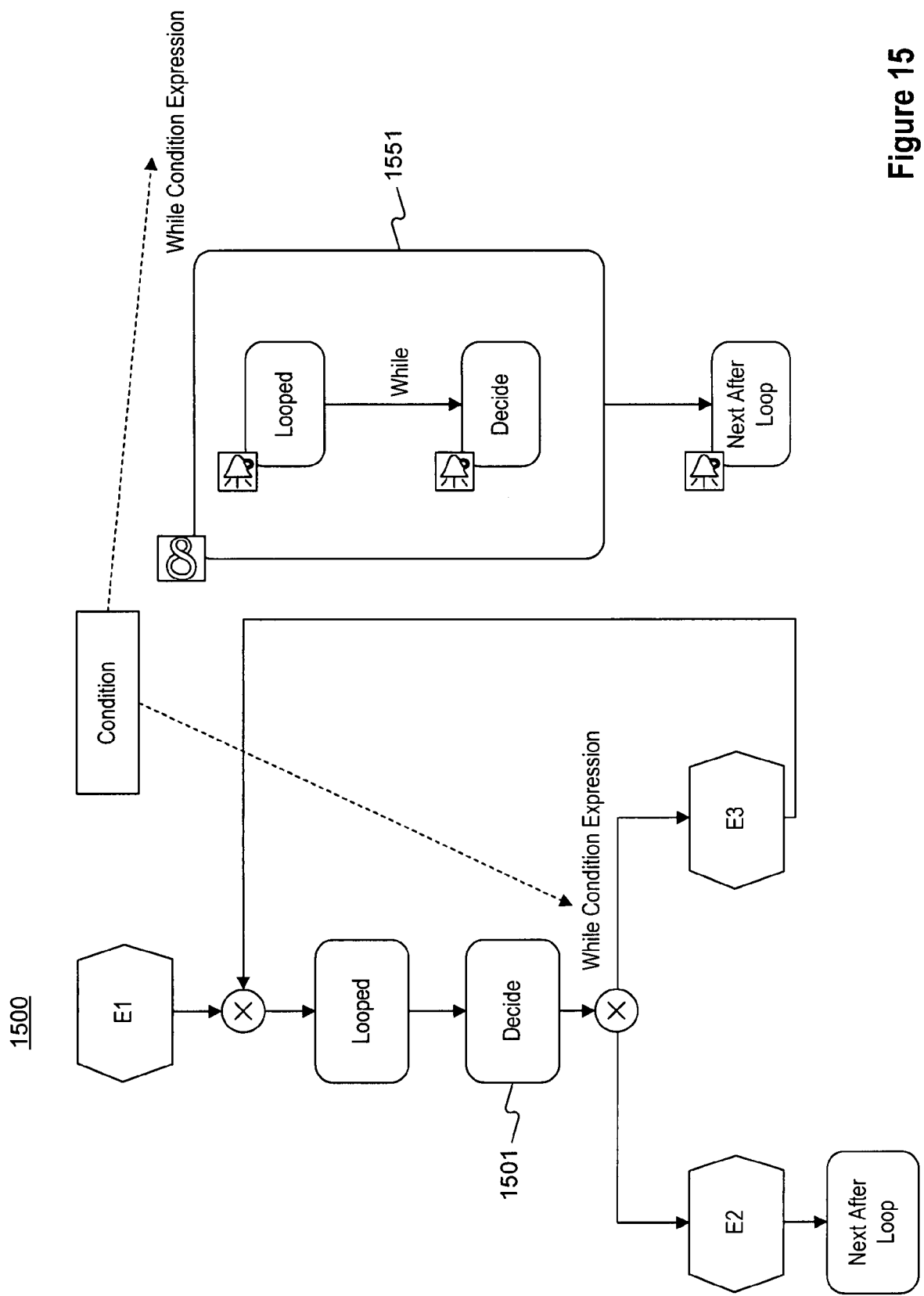
FIG. 15 an exemplary transformation of an EPC model into a BPEL process, consistent with an embodiment of the invention.

As shown in the example of FIG. 15, in order to implement a do-while loop, decide step 1501 in EPC diagram 1500 may be mapped by a transformation rule after looped activities to while BPEL activity 1551. The loop condition is set as the "Path condition" attribute of while BPEL activity 1551.

Figure 16:
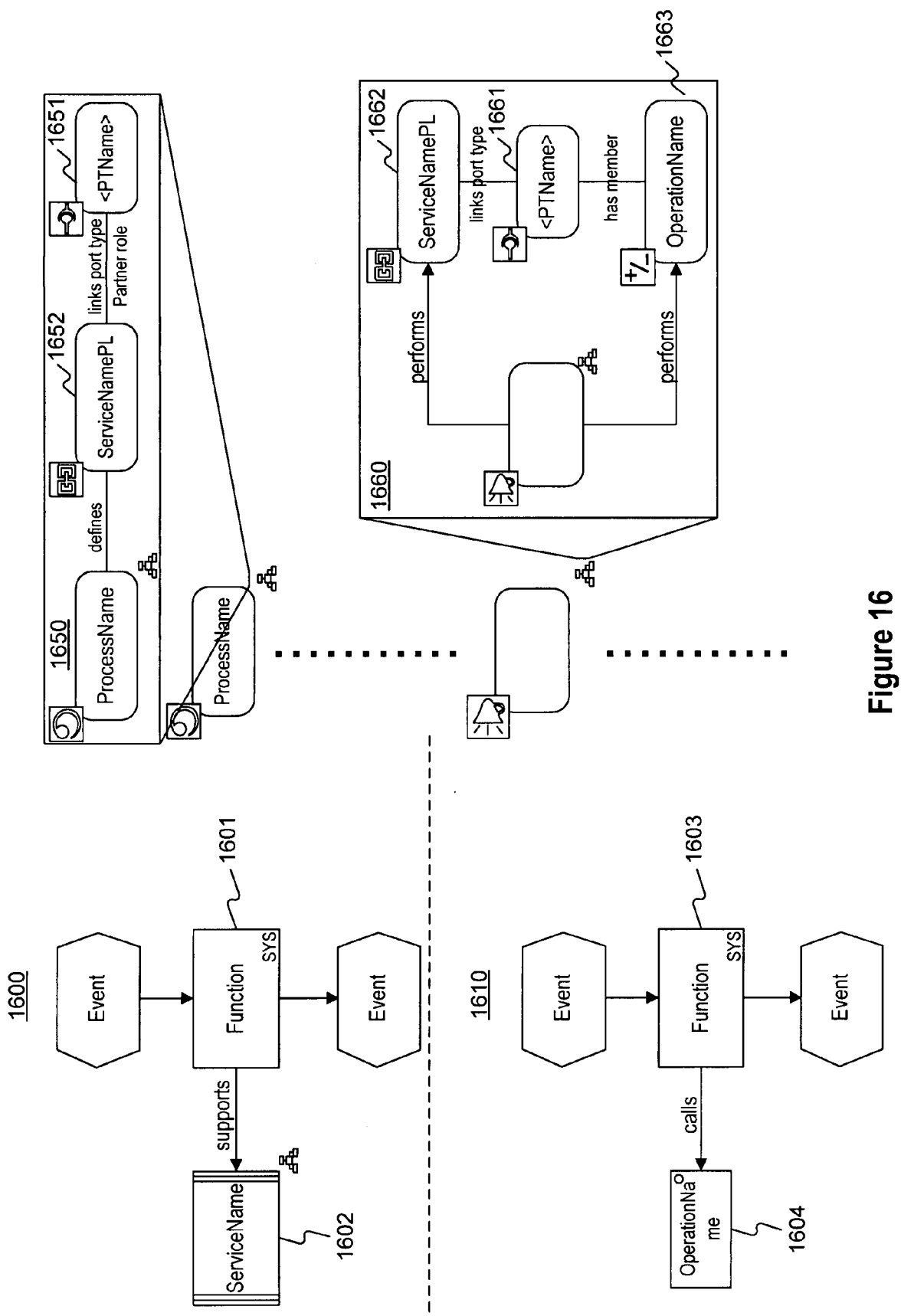
FIG. 16 illustrates an exemplary transformation of an EPC model into a BPEL process, consistent with an embodiment of the invention.

Service information can be specified either as an object representing the service, or as an object representing an operation associated with the service. FIG. 16 contains EPC diagram 1600 and BPEL process 1650, which illustrate specifying service information as an object representing the service. EPC diagram 1600 contains function 1601, which is supported by service 1602. Service 1602 may be mapped by a transformation rule into BPEL process 1650 using PortType 1651.

FIG. 16 also contains EPC diagram 1610 and BPEL process 1660, which illustrate specifying service information as an object representing an operation associated with the service. EPC diagram 1610 contains function 1603, supported by operation 1604. Operation 1604 may be mapped by a transformation rule into BPEL process 1660 using PortType

1661, of which operation 1663 is a member. Alternately, the transformation rule can specify mapping operation 1604 directly to operation 1663.

Whether service information is represented as an object representing the service, or as an operation, a BPEL Partner Role attribute can maintained on the connection between PartnerLinks 1652 and 1662, and PortTypes 1651 and 1661, respectively.

Data objects that serve as input to or outputs of a business process are valuable for understanding the internal data flow between business process steps in an EPC. As discussed above, input and output business data objects specified as Orchestration Process Steps provide information about what messages should be sent to\received from orchestrated services. In turn, it is possible to determine data flow of an executable process.

Consistent with embodiments of the invention, data objects can be used programmatically to express ideas as symbols in EPCs and executable processes. In some circumstances, the same data object can appear in both an EPC and an executable process, as a symbol that describes the semantic meaning of the object in the context of the EPC or BPEL process. Alternately, symbols in a BPEL process can be represented by a first object, and a corresponding symbol in an EPC can be represented by a second object. Relationship types can be defined between objects, such as "is input for" or "has output of." Such logical relationships between symbols in an EPC may be maintained by the data objects, and analyzed when the EPC is converted into an executable process.

If different data objects are used to represent corresponding symbols in an EPC and a BPEL process, the data objects for the EPC may be associated with the corresponding data objects in the executable process (technical data objects). The technical data objects can be used as invocation parameters of web service operations. Alternately, the technical data objects can be reused within the EPC, and no association between EPC and technical data objects is necessary.

If a process step in an EPC has input and\or output business data objects that are associated to technical data objects, a message type can be generated as a wrapper for the data objects, and the message type will include types corresponding to the business data objects.

Figure 17:
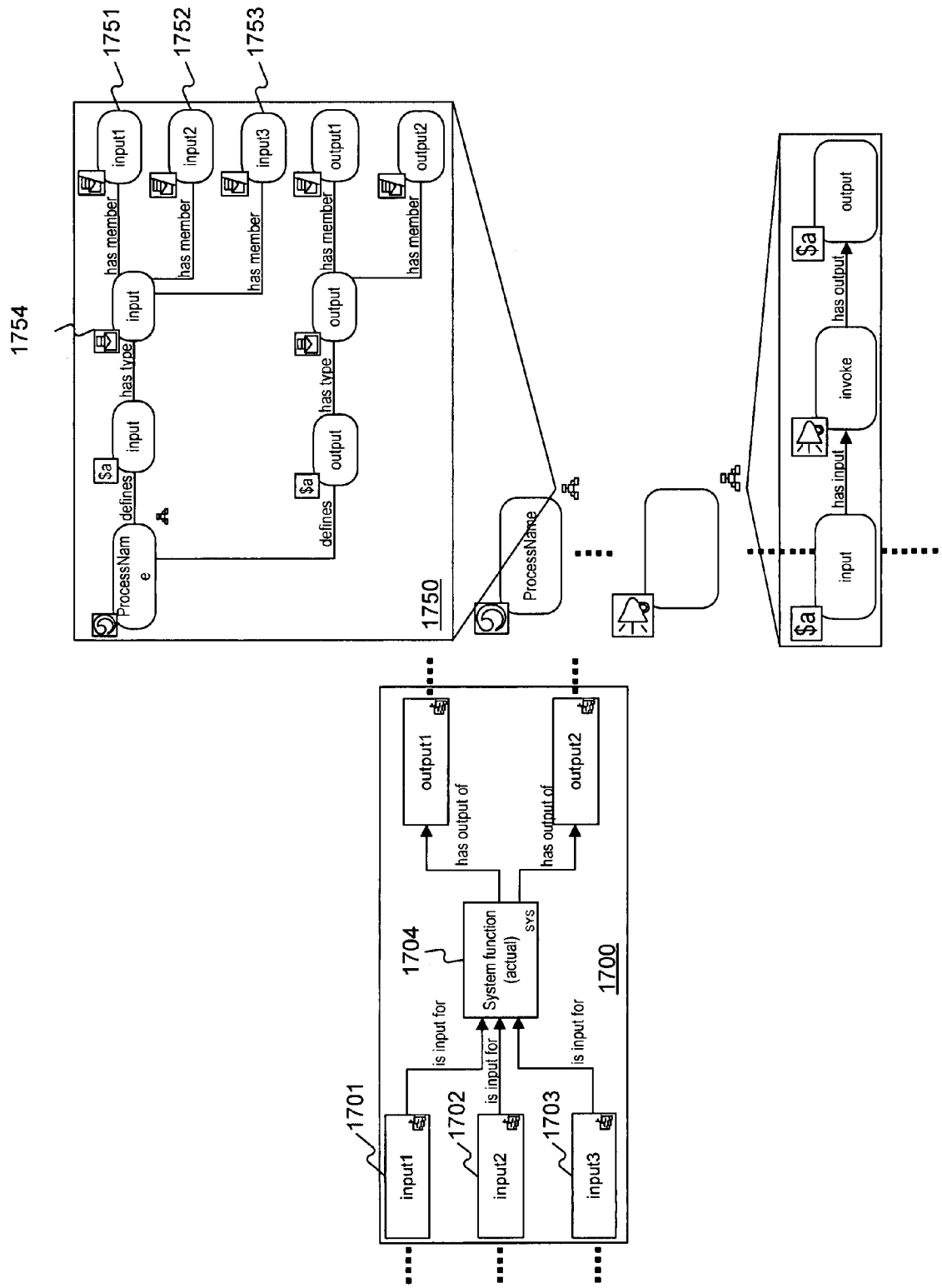
FIG. 17 illustrates an exemplary transformation of an EPC model into a BPEL process, consistent with an embodiment of the invention.

As shown in the example of FIG. 17, a system function 1704 in EPC 1700 can have three inputs, input1 1701, input2 1702, and input3 1703. According to a transformation rule for this system function, when transforming EPC 1700 into BPEL process 1750, three message parts are generated—1751, 1752, and 1753. In addition, message type input 1754 is created and connected with message parts 1751, 1752, and 1753, each of which is of a then of a type associated with input1 1701, input2 1702, and input3 1703, respectively.

Figure 18:
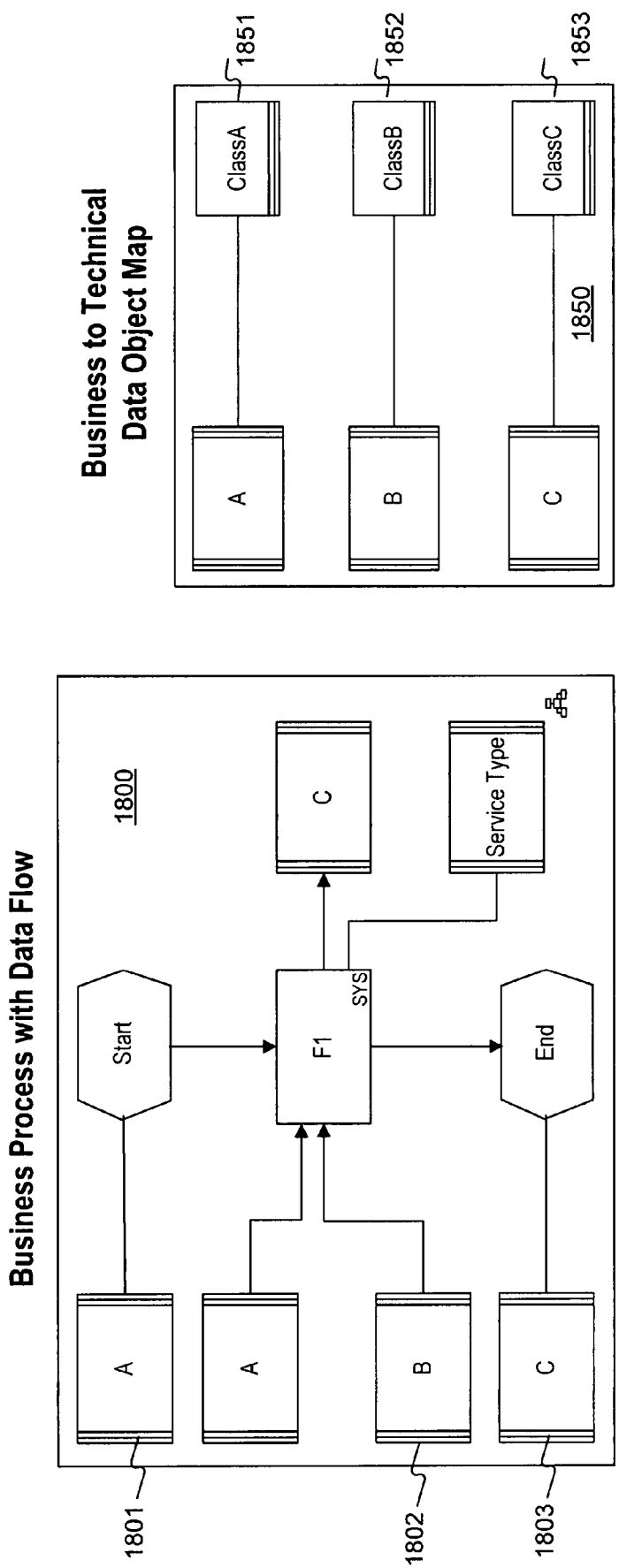
FIG. 18 illustrates an exemplary mapping of a business process to internal global data flow and local data flow in an executable process.

FIG. 18 illustrates business data flow chart 1800, which represents internal data flow in an executable process. Business data objects A 1801, B 1802, and C 1803 can be modeled as global internal data, because their parameter types correspond to the data in the business process. While this data flow reflects the business process well, the data flow may not match the orchestrated technical service operations For example, technical service operations, such as those using WSDL message types, usually do not share their parameter types. Therefore, as shown in technical data flow chart 1850, business data objects A 1801, B 1802, and C 1803 can correspond to local data objects such as classA 1851, classB 1852, and classC 1853. Thus, the global data flow of the executable process can correspond to the business data flow in the business process, while the local data flow in the executable process matches the data types required to use the technical service operations.

Figure 19:
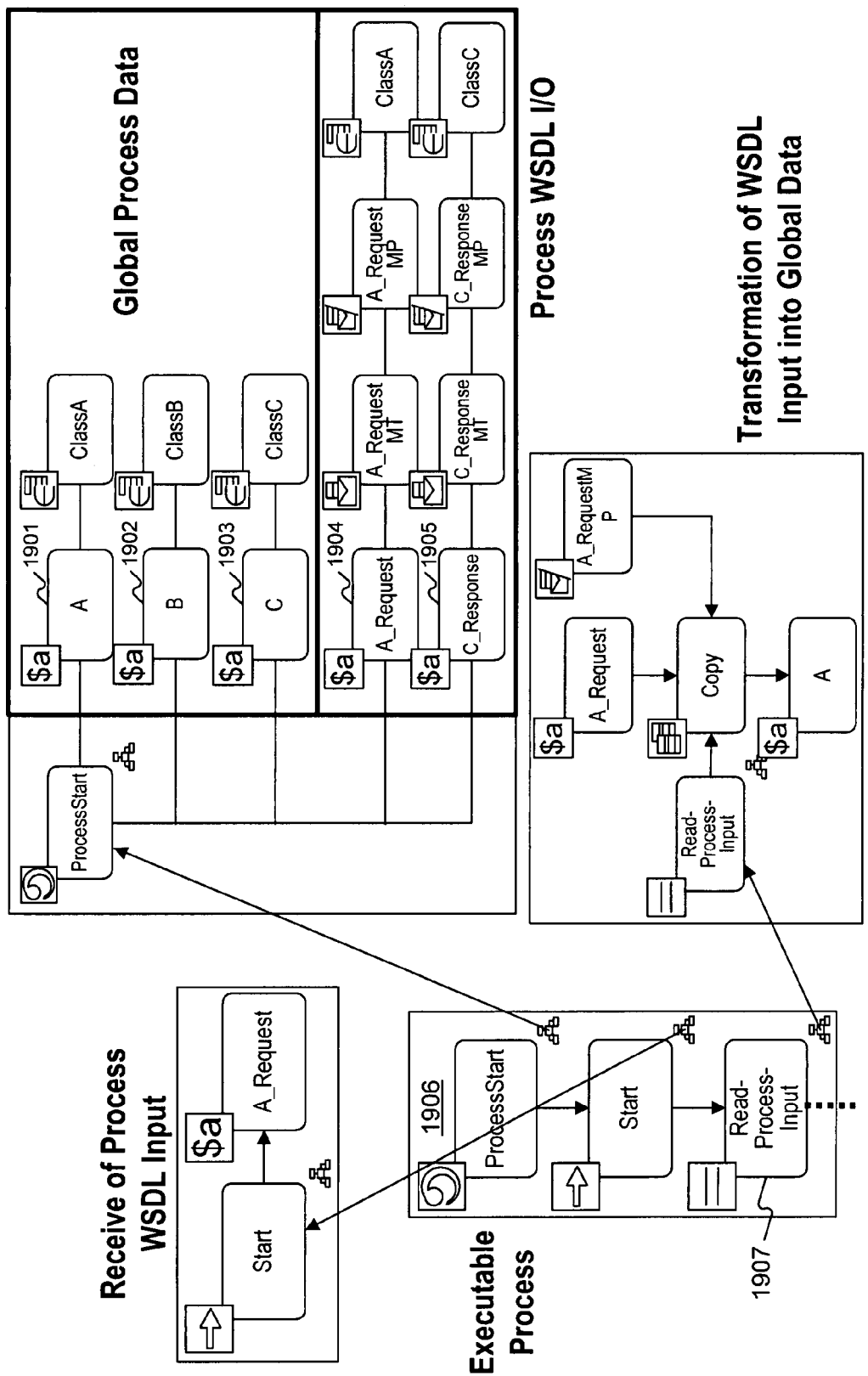
FIG. 19 illustrates an exemplary BPEL process, consistent with an embodiment of the invention.

Thus, when transforming from an EPC to BPEL, transforming input\output data objects of steps in EPCs creates global internal data flow for the corresponding executable BPEL process, and local data flow tailored to the technical service operations. As discussed above, business data objects in an EPC can be transformed into a global process data flow variable using transformation rules. Global process data flow variables A 1901, B 1902, and C 1903 are shown in the example of FIG. 19. Input and output process business data objects are wrapped in message types and transformed into global BPEL process input\output (WSDL) variables A_Request 1904 and C_Response 1905. Executable process 1906 receives\sends back global process WSDL variables A_Request 1904 and C_Response 1905 and converts their payloads into global process data flow variables using, for example, Assign BPEL activity 1907.

Figure 20:
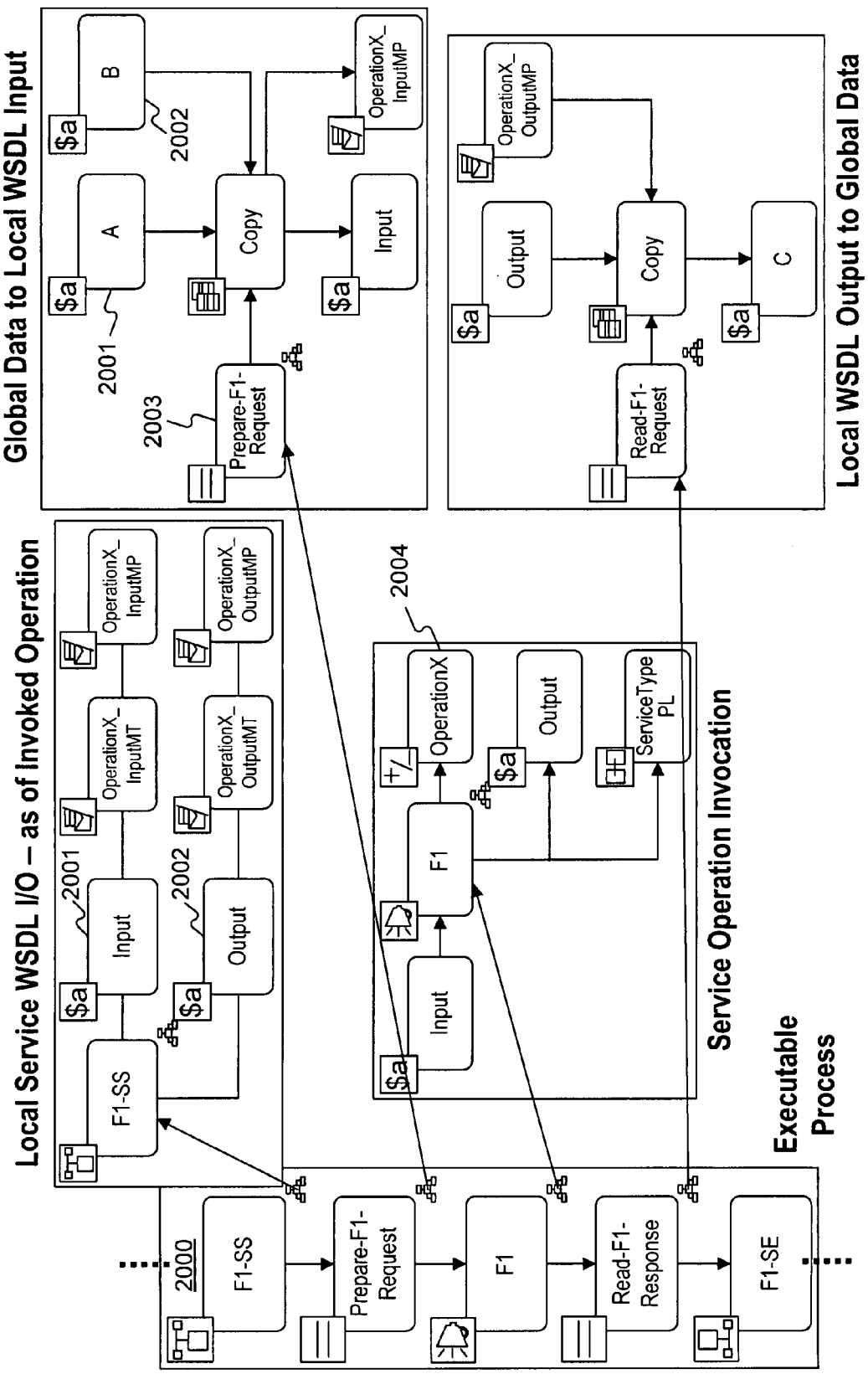
FIG. 20 illustrates an exemplary BPEL process, consistent with an embodiment of the invention.

As shown in the example of FIG. 20, local data flow can be defined using a transformation rule. For each interaction with a service at a particular BPEL scope by wrapping the interaction as input and\or output variables 2001 and 2002 in BPEL process 2000. These variable types are dependent on the corresponding technical service operation. For example, Assign BPEL activity 2003 can be used to convert the global data flow, which correspond to data flow of the business process, into local data flow variables A 2001 and B 2002. Local data flow variables A 2001 and B 2002 can be used in turn as inputs or outputs for an interaction with technical service operation 2004.

Figure 21:
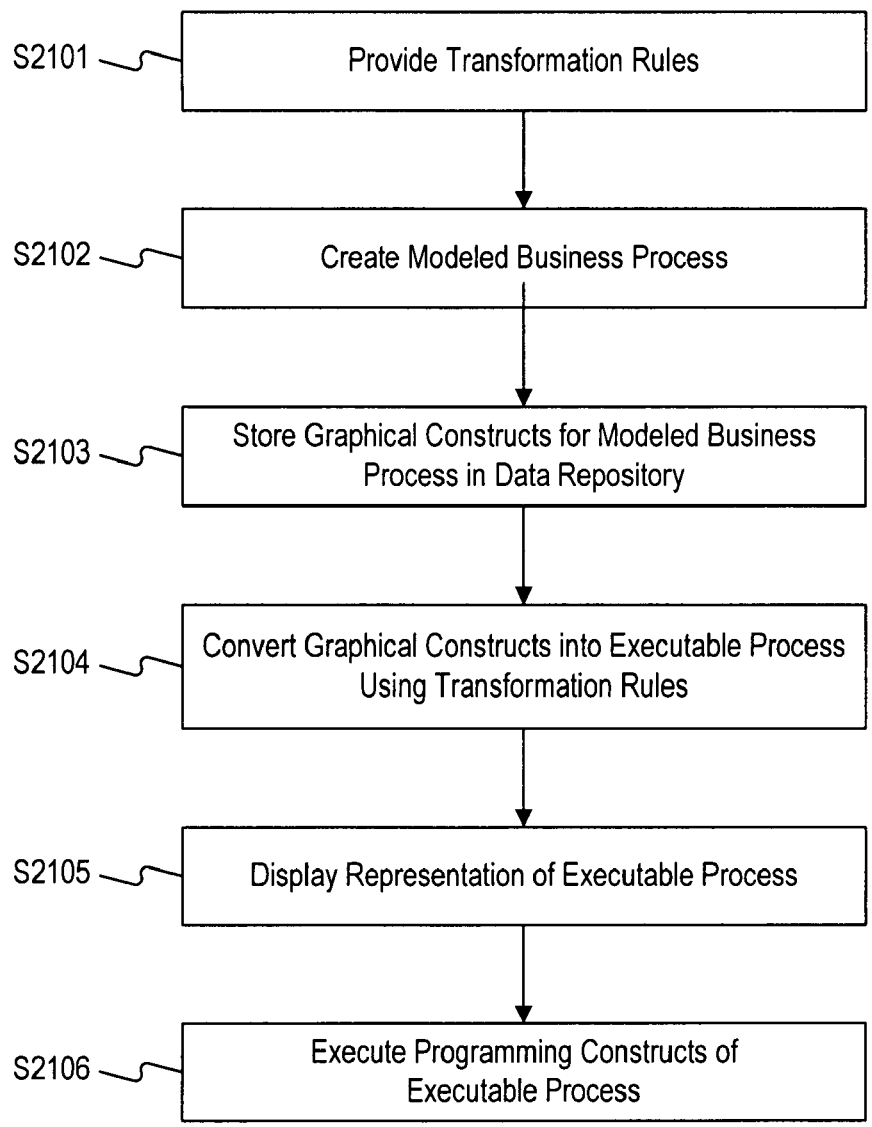
FIG. 21 is a flowchart of an exemplary method, consistent with an embodiment of the invention.

Consistent with an embodiment of the invention, FIG. 21 illustrates a flow chart of an exemplary method 2100. Method 2100 may be implemented in whole or in part to transform a modeled business process (an EPC diagram, in this example) into an executable process (a BPEL process, in this example). The various steps of method 2100 may be achieved in a computerized system, such as modeling system 100, with model conversion software 112 (see FIG. 1).

At step S2101, a set of transformation rules are provided. The set of transformation rules may be defined for converting graphical constructs of the EPC diagram into programming constructs for the executable process. As disclosed herein the graphical constructs may be implemented as EPC symbols representing, for example, elements of the modeled business process such as functions or events. The programming constructs may comprise BPEL code that implements activities in the executable process. The transformation rules may be stored in data repository 120 or together with model conversion software 112. Different sets of transformation rules may be stored depending on the form of conversion to be performed (EPC to BPEL constructs, EPC to XPDL constructs, etc.).

At step S2102, the modeled business process—if not already created—is defined using graphical constructs. By way of example, this step may include a business process designer creating an EPC diagram on computer 110, and annotating constructs (such as functions, events, etc.) in the EPC diagram with information such as services used by a given construct. At step S2103, the graphical constructs corresponding to the EPC diagram are stored in data repository 120. In one embodiment, the graphical constructs are stored as objects in data repository 120, with logical relationships and annotations, as needed.

At step S2104, the graphical constructs of the EPC diagram are converted by applying the appropriate transformation rules to create an executable BPEL process. As disclosed herein, this can be accomplished by model conversion software 112 on computer 110. In the preferred embodiment, EPC diagrams are first converted into a graphical BPEL process using BPEL symbols, and then converted into executable BPEL code. Alternately, the EPC diagrams can be converted directly into BPEL source or executable code. Optionally, at step S2105, the programming constructs of the BPEL process can be graphically displayed on computer 110 using BPEL symbols. Additionally, at step 2106, the BPEL process can be executed by executing the corresponding programming constructs. In one embodiment, the execution of the BPEL process is carried by executing the BPEL code in BPEL engines, such as ORACLE BPEL PM Server or IBM WebSphere Process Server.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computerized method for transforming an event-driven process chain (EPC) modeled business process into an executable business process, the method comprising:

providing a plurality of graphical constructs in a database, the plurality of graphical constructs representing elements in the EPC modeled business process;

providing a set of transformation rules in the database, the set of transformation rules including rules for converting the graphical constructs into programming constructs for the executable business process, wherein the set of transformation rules further include rules for converting a loop into programming constructs for the executable business process;

applying the set of transformation rules to the graphical constructs to generate the executable business process comprising an ordered sequence of programming constructs, wherein the ordered sequence of programming constructs comprises business process execution language (BPEL) representation; and storing the ordered sequence of programming constructs in the database for subsequent execution of the executable business process.

2. The method according to claim 1, wherein the programming constructs are graphical symbols representing objects corresponding to an execution language description notation.

3. The method according to claim 2, wherein the graphical symbols comprise business process execution language (BPEL) symbols.

4. The method according to claim 1, wherein the programming constructs are objects corresponding to an execution language description notation.

5. The method according to claim 4, wherein the objects corresponding to the execution language description notation comprise business process execution language (BPEL) code.

6. The method according to claim 1, wherein applying the set of transformation rules comprises ordering the sequence of the programming constructs according to logical relationships in the EPC modeled business process.

7. The method according to claim 1, wherein one of the transformation rules indicates that an AND operator in the EPC modeled business process is transformed into a programming construct corresponding to a flow BPEL activity.

8. The method according to claim 1, wherein one of the transformation rules indicates that an XOR operator in the EPC modeled business process is transformed into a programming construct corresponding to a pick BPEL activity.

9. The method according to claim 1, wherein one of the transformation rules indicates that a decision path with no business process steps in the EPC modeled business process is transformed into a programming construct corresponding to an Empty BPEL activity.

10. The method according to claim 1 further comprising: displaying the ordered sequence of programming constructs including the graphical BPEL representations.

11. The method according to claim 1, wherein the set of transformation rules further include rules for converting both closed and implicitly closed parallel flow EPC processes into programming constructs for the executable business process.

12. A non-transitory computer-readable medium comprising programmable instructions adapted to perform a computerized method for transforming an event-driven process chain (EPC) modeled business process into an executable business process, the method comprising:

providing a plurality of graphical constructs in a database, the plurality of graphical constructs representing elements in the EPC modeled business process;

providing a set of transformation rules in the database, the set of transformation rules including rules for converting the graphical constructs into programming constructs for the executable business process,
wherein the set of transformation rules further include rules for converting a loop into programming constructs for the executable business process;
applying the set of transformation rules to the graphical constructs to generate the executable business process comprising an ordered sequence of programming constructs,
wherein the ordered sequence of programming constructs comprises business process execution language (BPEL) representation; and
storing the ordered sequence of programming constructs in the database for subsequent execution of the executable business process.

13. The non-transitory computer-readable medium according to claim 12, wherein the programming constructs are graphical symbols representing objects corresponding to an execution language description notation.

14. The non-transitory computer-readable medium according to claim 13, wherein the graphical symbols comprise business process execution language (BPEL) symbols.

15. The non-transitory computer-readable medium according to claim 12, wherein the programming constructs are objects corresponding to an execution language description notation.

16. The non-transitory computer-readable medium according to claim 15, wherein the objects corresponding to the execution language description notation comprise business process execution language (BPEL) code.

17. The non-transitory computer-readable medium according to claim 12, wherein applying the set of transformation rules comprises ordering the sequence of the programming constructs according to logical relationships in the EPC modeled business process.

18. The non-transitory computer-readable medium according to claim 12, wherein one of the transformation rules indicates that an AND operator in the EPC modeled business process is transformed into a programming construct corresponding to a flow BPEL activity.

19. The non-transitory computer-readable medium according to claim 12, wherein one of the transformation rules indicates that an XOR operator in the EPC modeled business process is transformed into a programming construct corresponding to a pick BPEL activity.

20. The non-transitory computer-readable medium according to claim 12, wherein one of the transformation rules indicates that a decision path with no business process steps in the EPC modeled business process is transformed into a programming construct corresponding to an Empty BPEL activity.

21. A system for transforming an event-driven process chain (EPC) modeled business process into an executable business process comprising:
a database for storing a plurality of graphical constructs, the plurality of graphical constructs representing elements in the EPC modeled business process, and for storing a set of transformation rules in the database, the set of transformation rules including rules for converting the graphical constructs into programming constructs for the executable business process, wherein the set of transformation rules further include rules for converting a loop into programming constructs for the executable business process; and
a processor for executing model transformation software, the model conversion software comprising instructions for causing the processor to:
apply the set of transformation rules to the graphical constructs to generate the executable business process comprising an ordered sequence of programming constructs,
wherein the ordered sequence of programming constructs comprises business process execution language (BPEL) representation, and
store the ordered sequence of programming constructs in the database for subsequent execution of the executable business process.

22. The system according to claim 21, wherein the programming constructs are graphical symbols representing objects corresponding to an execution language description notation.

23. The system according to claim 22, wherein the graphical symbols comprise business process execution language (BPEL) symbols.

24. The system according to claim 21, wherein the programming constructs are objects corresponding to an execution language description notation.

25. The system according to claim 24, wherein the objects corresponding to the execution language description notation comprise business process execution language (BPEL) code.

26. The system according to claim 21, wherein the instructions to apply the set of transformation rules comprise instructions to order the sequence of the programming constructs according to logical relationships in the EPC modeled business process.

27. The system according to claim 21, wherein one of the transformation rules indicates that an AND operator in the EPC modeled business process is transformed into a programming construct corresponding to a flow BPEL activity.

28. The system according to claim 21, wherein one of the transformation rules indicates that an XOR operator in the EPC modeled business process is transformed into a programming construct corresponding to a pick BPEL activity.

29. The system according to claim 21, wherein one of the transformation rules indicates that a decision path with no business process steps in the EPC modeled business process is transformed into a programming construct corresponding to an Empty BPEL activity.

30. A computerized method for transforming an event-driven process chain (EPC) modeled business process into an executable business process, the method comprising: providing a plurality of graphical constructs in a database, the plurality of graphical constructs representing elements in the EPC modeled business process;
providing a set of transformation rules in the database, the set of transformation rules including rules for converting the graphical constructs into programming constructs for the executable business process, wherein the set of transformation rules further include rules for converting a loop into programming constructs for the executable business process;
applying the set of transformation rules to the graphical constructs to generate the executable business process comprising an ordered sequence of programming constructs, wherein the ordered sequence of programming constructs comprises graphical business process execution language (BPEL) symbols; and
displaying the ordered sequence of programming constructs including the graphical BPEL symbols.

* * * * *